United States Patent
Ferdi et al.

(10) Patent No.: US 12,439,234 B2
(45) Date of Patent: Oct. 7, 2025

(54) METHODS AND APPARATUS FOR DIRECT DISCOVERY AND COMMUNICATION USING A WTRU TO WTRU RELAY

(71) Applicant: InterDigital Patent Holdings, Inc., Wilmington, DE (US)

(72) Inventors: Samir Ferdi, Kirkland (CA); Michelle Perras, Montreal (CA); Saad Ahmad, Montreal (CA); Xiaoyan Shi, Westmount (CA)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 534 days.

(21) Appl. No.: 17/772,249

(22) PCT Filed: Nov. 6, 2020

(86) PCT No.: PCT/US2020/059417
§ 371 (c)(1),
(2) Date: Apr. 27, 2022

(87) PCT Pub. No.: WO2021/092384
PCT Pub. Date: May 14, 2021

(65) Prior Publication Data
US 2022/0377524 A1 Nov. 24, 2022

Related U.S. Application Data

(60) Provisional application No. 62/932,147, filed on Nov. 7, 2019, provisional application No. 62/935,971, filed
(Continued)

(51) Int. Cl.
*H04W 8/00* (2009.01)
*H04W 76/14* (2018.01)
(Continued)

(52) U.S. Cl.
CPC .......... *H04W 8/005* (2013.01); *H04W 76/14* (2018.02); *H04W 88/04* (2013.01); *H04W 92/18* (2013.01)

(58) Field of Classification Search
CPC ..... H04W 8/005; H04W 76/14; H04W 88/04; H04W 92/18
(Continued)

(56) References Cited

U.S. PATENT DOCUMENTS

| | | | |
|---|---|---|---|
| 9,992,806 | B2 | 6/2018 | Stojanovski |
| 10,212,564 | B2 | 2/2019 | Watfa et al. |

(Continued)

FOREIGN PATENT DOCUMENTS

| | | |
|---|---|---|
| CN | 107113593 A | 8/2017 |
| CN | 107771398 A | 3/2018 |

(Continued)

OTHER PUBLICATIONS

3rd Generation Partnership Project; "Technical Specification Group Services and System Aspects; Architecture enhancements for 5G System (5GS) to support Vehicle-to-Everything (V2X) services (Release 16)", 3GPP TS 23.287 V16.0.0, Sep. 2019, 49 pages.

(Continued)

*Primary Examiner* — Mansour Oveissi
(74) *Attorney, Agent, or Firm* — Flaster Greenberg P.C.

(57) ABSTRACT

Methods, apparatus, systems, architectures and interfaces, performed by a relay wireless transmit/receive unit (R-WTRU) including a transmitter, a receiver, a memory, and a processor, for establishing extended unicast links and management unicast links are provided. The method includes: performing, by the R-WTRU, a link establishment procedure for establishing any number of extended unicast links for relaying traffic between a service-provider WTRU (SP-WTRU) and any number of service-user WTRUs (SU- (Continued)

WTRUs) according to a mapping generated by the R-WTRU, the link establishment procedure including: (1) generating a mapping of any of the extended links and layer 2 (L2) identifiers (IDs) for any of a SP-WTRU, a R-WTRU, and any number of SU-WTRUs, and (2) transmitting a unique relay ID; establishing a management unicast link for the extended unicast links; and applying any number of link management requests received via the management unicast link to associated extended unicast links.

15 Claims, 23 Drawing Sheets

Related U.S. Application Data on Nov. 15, 2019, provisional application No. 62/975,834, filed on Feb. 13, 2020, provisional application No. 63/028,112, filed on May 21, 2020.

(51) Int. Cl.
*H04W 88/04* (2009.01)
*H04W 92/18* (2009.01)

(58) Field of Classification Search
USPC .......................................................... 370/329
See application file for complete search history.

(56) References Cited

U.S. PATENT DOCUMENTS

| | | | |
|---|---|---|---|
| 2016/0285934 A1* | 9/2016 | Cheng | H04W 4/06 |
| 2016/0381491 A1* | 12/2016 | Watfa | H04W 72/04 |
| | | | 455/41.2 |
| 2017/0142594 A1 | 5/2017 | Zhang | |
| 2017/0323562 A1 | 11/2017 | Rech et al. | |
| 2022/0141898 A1* | 5/2022 | Kim | H04W 8/005 |
| | | | 370/315 |

FOREIGN PATENT DOCUMENTS

| | | |
|---|---|---|
| WO | WO 2016210048 A1 | 12/2016 |
| WO | WO 2017/022164 A1 | 2/2017 |

OTHER PUBLICATIONS

3rd Generation Partnership Project; "Technical Specification Group Services and System Aspects; Study on system enhancement for Proximity based Services (ProSe) in the 5G System (5GS). (Release 17)", 3GPP TR 23.752 0.1.0, Oct. 2019, 12 pages.

$3^{rd}$Generation Partnership Project; "UE-to-UE Relay of MCPTT Communications", SA WG2 Meeting #106, Nov. 17-21, 2014, San Francisco, California, USA, S2-144118, 6 pages.

$3^{rd}$Generation Partnership Project; "UE-to-UE Relays: Self-Organising Discovery and Relaying of Group Communications", SA WG2 Meeting #106, Nov. 17-21, 2014, San Francisco, California, USA, S2-144579, 4 pages.

* cited by examiner

METHODS AND APPARATUS FOR DIRECT DISCOVERY AND COMMUNICATION USING A WTRU TO WTRU RELAY

CROSS-REFERENCE TO RELATED APPLICATIONS

This application is the 371 National Stage of International Application No. PCT/US2020/059417, filed Nov. 6, 2020, which claims priority to U.S. Provisional Application No. 62/932,147, filed Nov. 7, 2019, U.S. Provisional Application No. 62/935,971, filed Nov. 15, 2019, U.S. Provisional Application No. 62/975,834, filed Feb. 13, 2020, and U.S. Provisional Patent Application No. 63/028,112, filed May 21, 2020, the disclosures of which are incorporated herein by reference in their entireties.

BACKGROUND

The present invention relates to the field of communications and, more particularly, to methods, apparatus, systems, architectures and interfaces for communications in an advanced or next generation wireless communication system, including communications carried out using a new radio and/or new radio (NR) access technology and communication systems. Such communication systems may include relay communications performed by wireless communication relays and Vehicle-to-Everything (V2X) services and Proximity Services (ProSe).

BRIEF DESCRIPTION OF THE DRAWINGS

Furthermore, like reference numerals in the figures indicate like elements, and wherein.

EXAMPLE NETWORKS FOR IMPLEMENTATION OF THE EMBODIMENTS

Figure 1A:
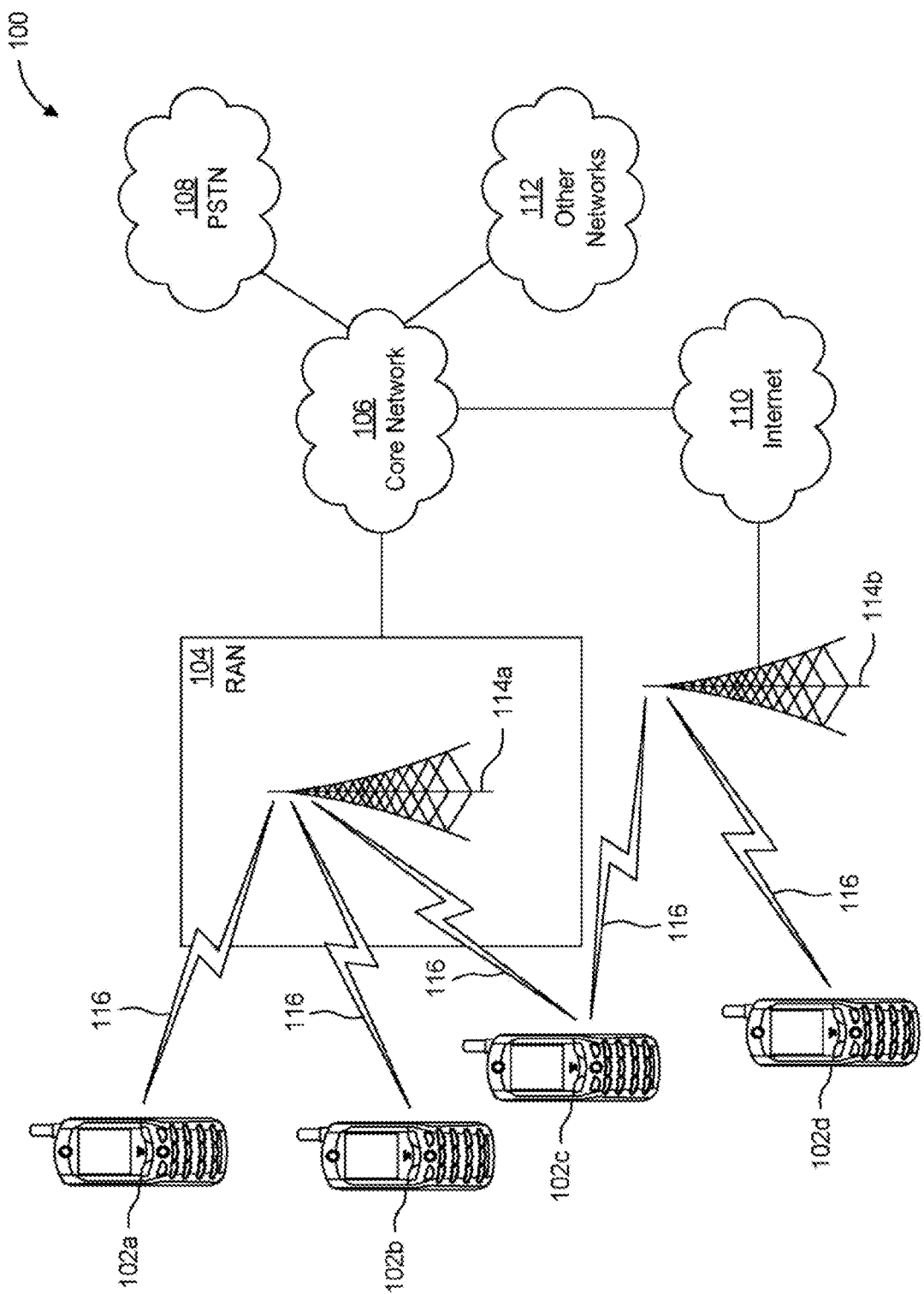
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
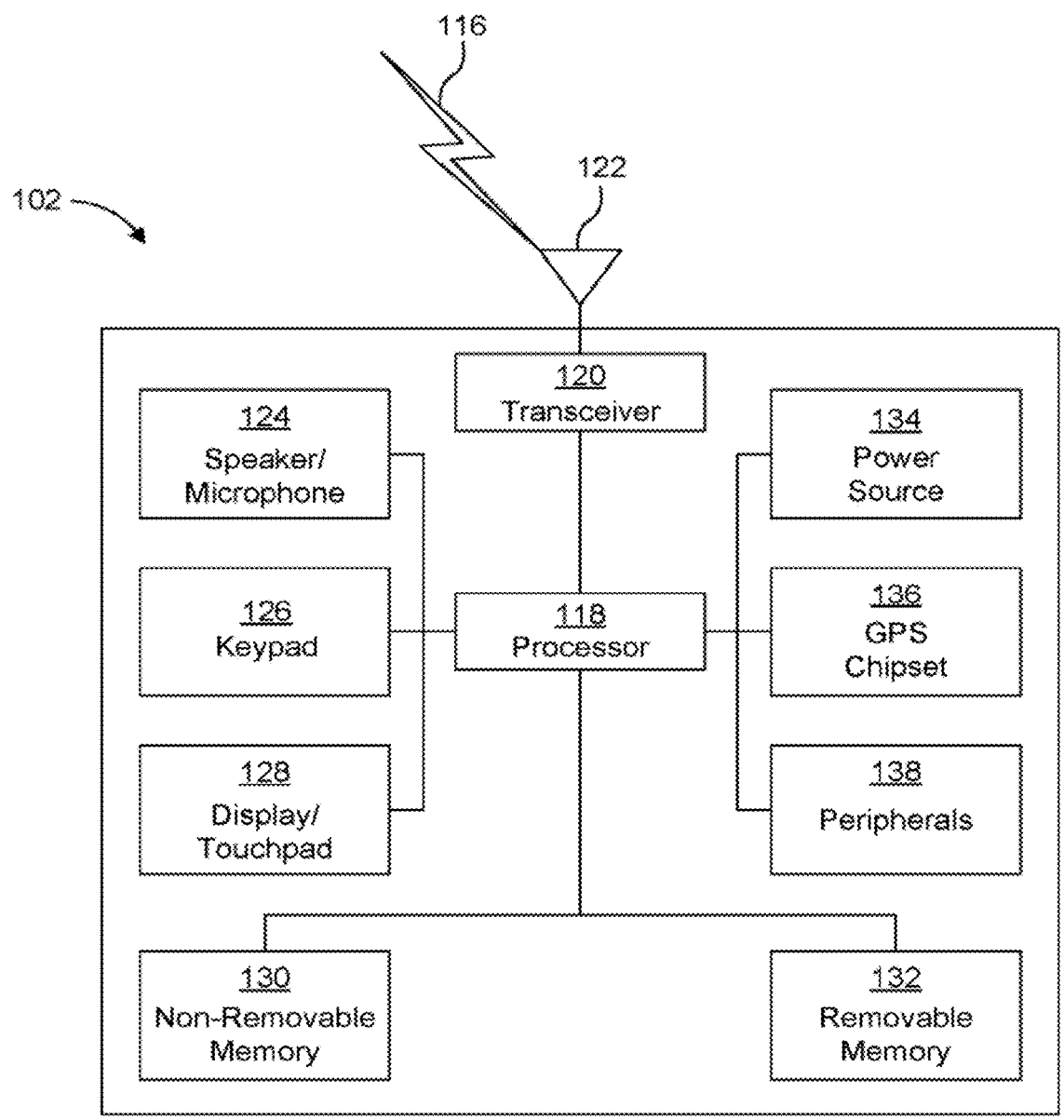
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
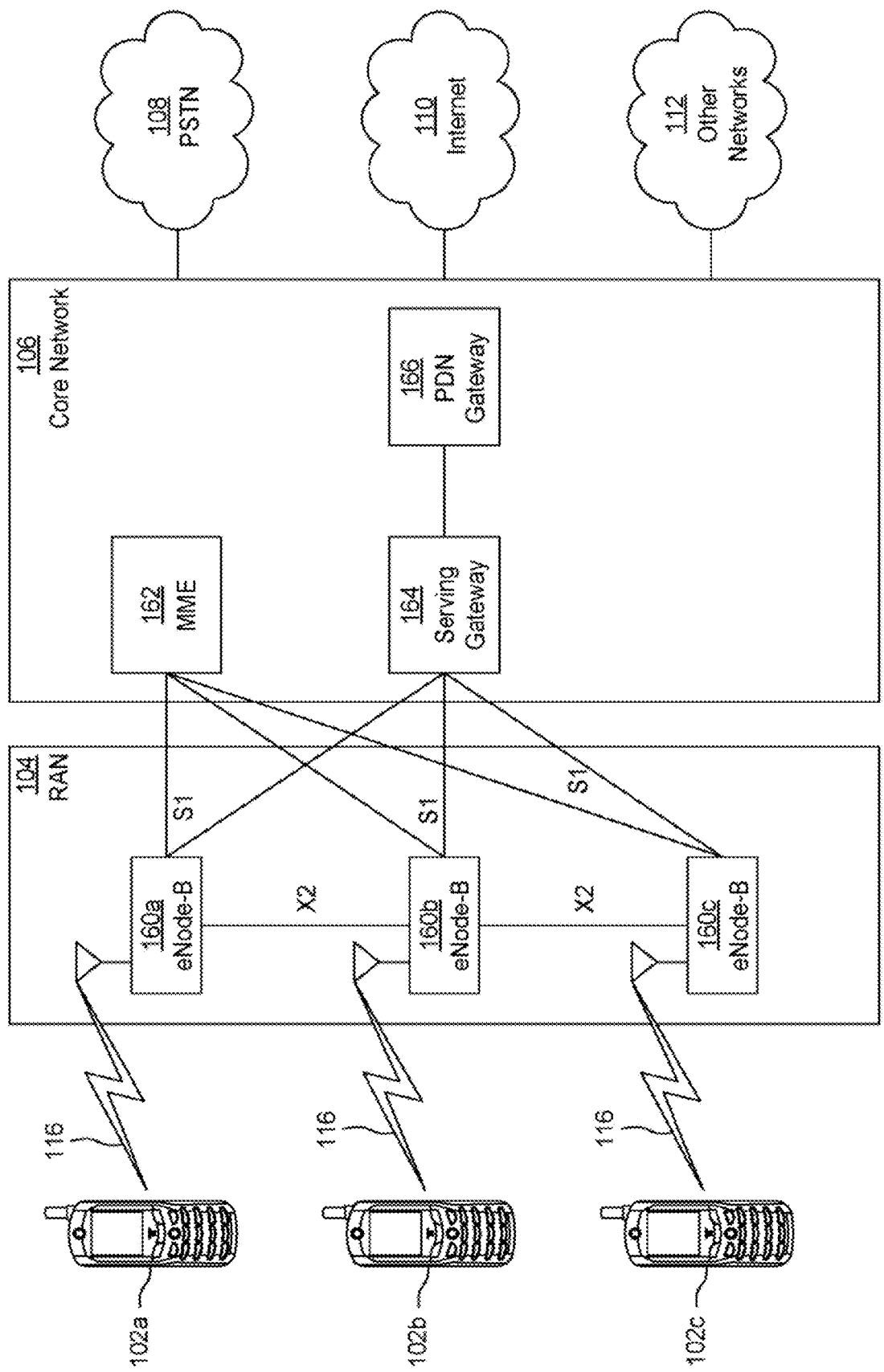
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11 af and 802.11 ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11 ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
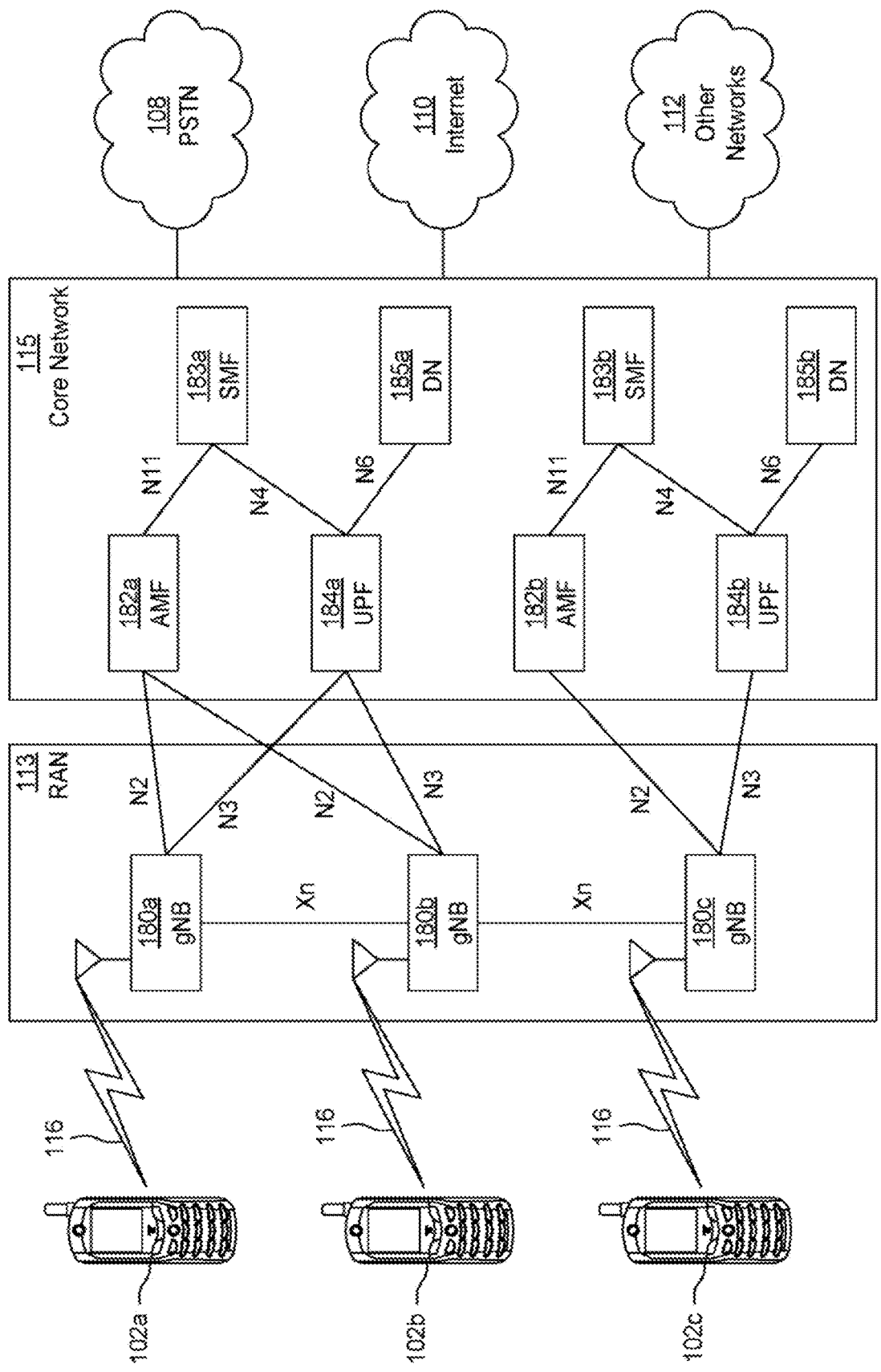
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a,184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Figure 1E:
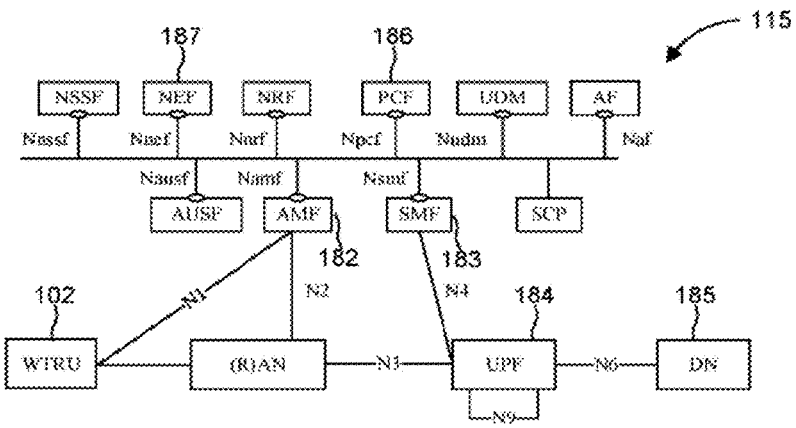
FIG. 1E is a block diagram illustrating various example elements of the example communications system.

FIG. 1E is a block diagram illustrating various example elements of the communications system 100. Such elements may be included, for example, in embodiments of the communications system 100 in which such system is configured in accordance with 5G and/or NR. The elements may include WTRU(s) 102, (R)AN(s) 113, DN(s) 185 and elements of a core network 115, including an AMF 182, an SMF 183, a UPF 184, a policy control function (PCF) 186, and a network exposure function (NEF) 187. For convenience and simplicity of exposition, the terms "5G core network" and "5GC" may be used interchangeably with CN 115.

The AMF 182 may carry out various functions, including, for example, any of the following: termination of a RAN CP interface (N2), termination of NAS (N1), NAS ciphering and integrity protection, registration management, connection management, reachability management, mobility management, lawful intercept, etc. The SMF 183 may carry out various functions, including, for example, any of the following: session management (including session establishment, modification and release), IP address allocation, selection and control of user plane function(s), etc. The PCF 186 may carry out various functions, including, for example, any of the following: providing support for a unified policy framework to govern network behavior, providing policy rules to one or more control plane functions to enforce them, etc. The NEF 187 may carry out various functions, including, for example, any of the following: exposing capabilities and events, secure provisioning of information from external application to the network, etc. The UPF 184 may carry out various functions, including, for example, any of the following: operating as an anchor point for intra-/inter-RAT mobility, allocation of UE IP address, external PDU Session point of interconnect to a DN, such as DN 185, packet routing and forwarding, packet inspection, etc. The RAN 113 may be configured as any of a NG-RAN and non-3GPP AN. The RAN 113 may connect to a CN, which, for example, may be configured as a 5G core network.

Figure 1F:
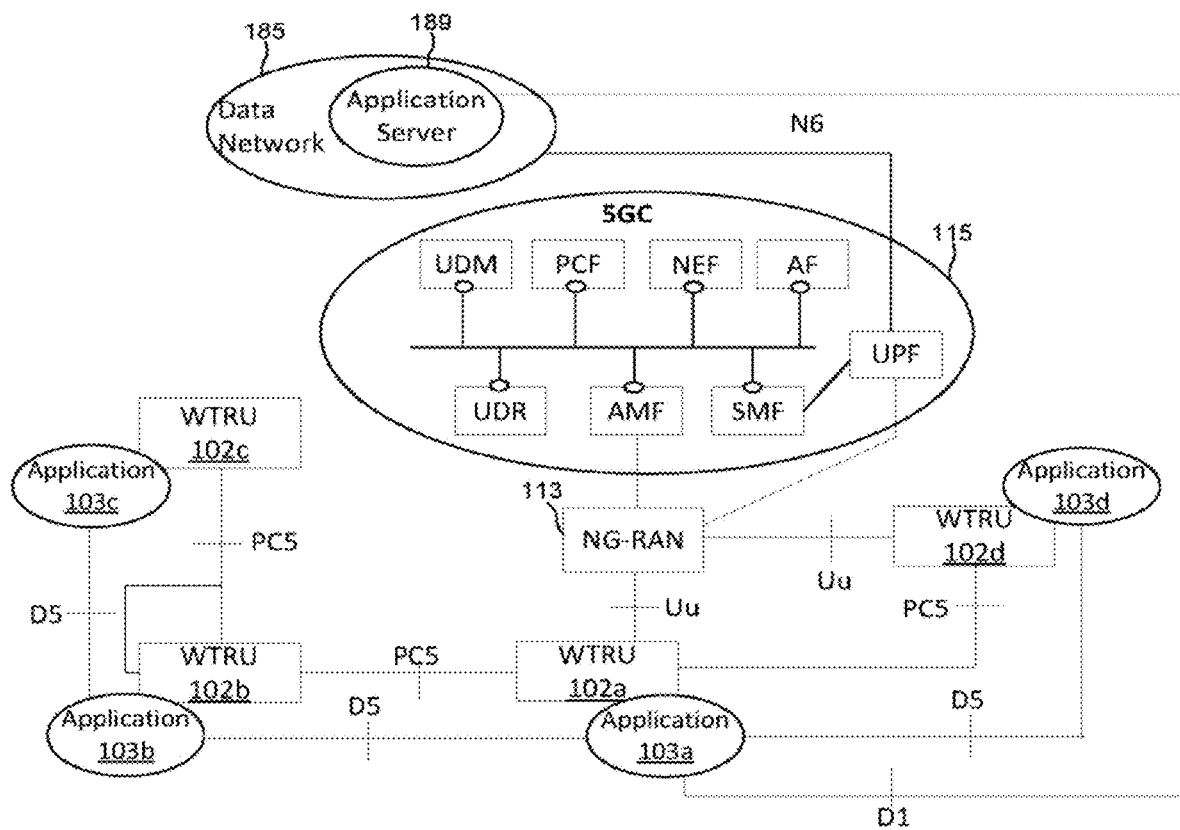
FIG. 1F is a block diagram illustrating an example architecture of the example communications system.

FIG. 1F is a block diagram illustrating an example architecture of the communications system 100 configured in accordance with 5G and/or NR. For convenience and simplicity of exposition, the terms "5G System" and its abbreviation "5GS" may be used herein to refer to the communications system 100 configured in accordance with 5G and/or NR. The example architecture shown in FIG. 1F may be suitable for various services in 5GS, including any of proximity-based services (ProSe), vehicle-to-everything (V2X) services and other device-to-device (D2D) communication services. The example architecture may include WTRUs 102*a-d*, an NG-RAN 113, a DN 185 and a 5GC 115.

Each of the WTRUs 102*a-d* may include an application ("WTRU application") 103. The WTRU application may be, for example, any of a ProSe application, a V2X application and other like-type applications). The DN 185 may include an application server 189. The application server 189 may include one or more applications that service any of the WTRU applications.

D1 is a reference point between a WTRU application 103 and an application in the application server 189. D5 is a reference point between the WTRU applications 103 (e.g., between and/or among two or more WTRU applications 103 of the WTRUs 102*a*-d). PC5 is a D2D interface for direct D2D communications between and/or among two or more of the WTRUs 102*a-d*. The PC5 interface may be configured, for example, as any of an LTE-based PC5, NR-based PC5 and the like. The terms PC5 interface and "sidelink" (at the PHY layer) may be referred to herein interchangeably.

Direct D2D communication, such as ProSe direct communication, enable establishment of communication paths between two or more of the WTRUs 102 that are within proximity/range of each other. Direct D2D discovery, such as ProSe direct discovery, may be used by a WTRU 102 to identify other WTRUs in proximity. Details for provisioning the WTRUs for direct communication and/or direct discovery and/or for both in-coverage and out-of-coverage scenarios may be found, for example, in 3GPP TS 23.303 V15.1.0.

DETAILED DESCRIPTION

V2X Direct Discovery and Link Establishment

Figure 2:
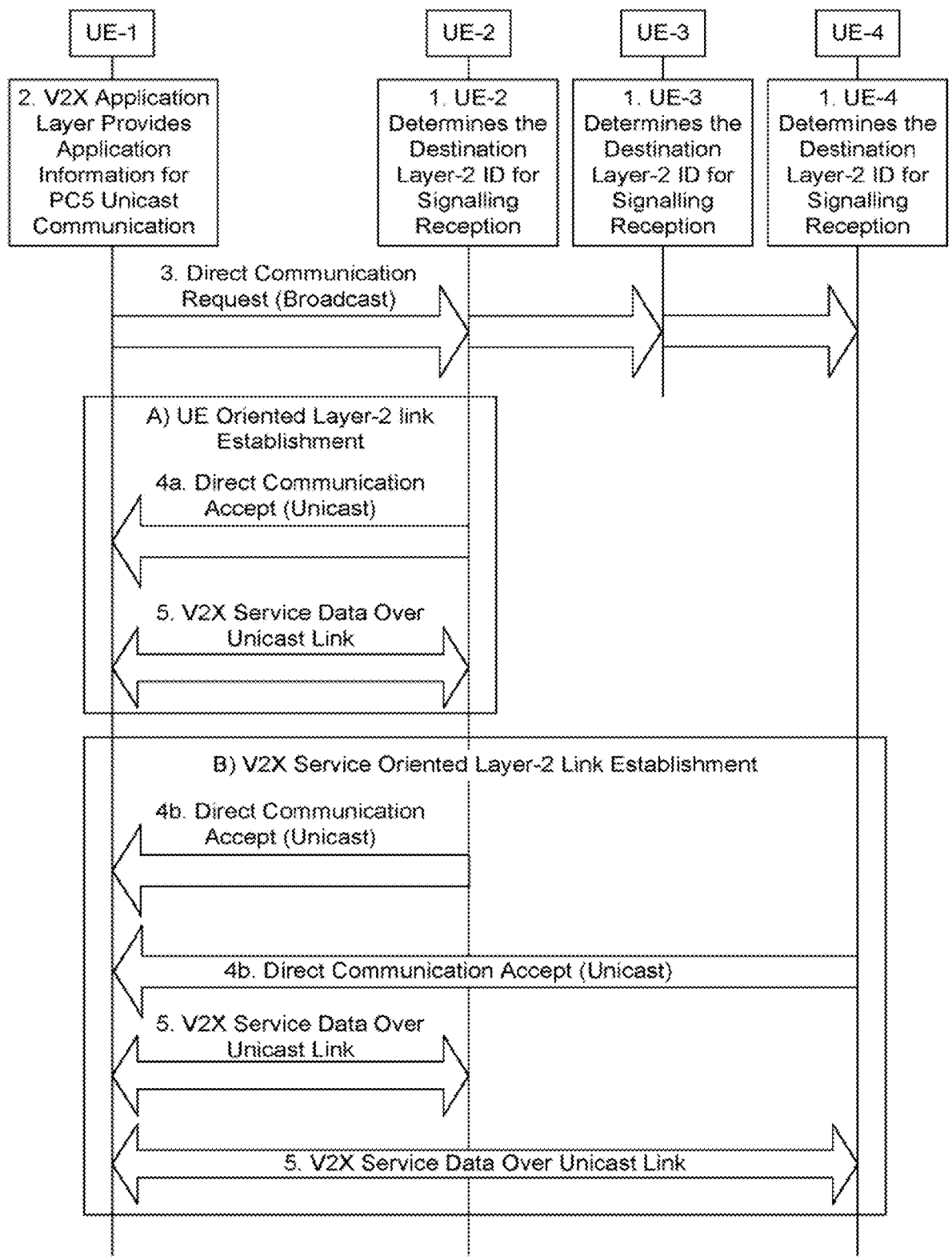
FIG. 2 is a diagram illustrating Release 16 (Rel-16) Vehicle To Everything (V2X) link establishment.

FIG. 2 is a diagram illustrating Release 16 (Rel-16) Vehicle To Everything (V2X) (e.g., which may interchangeably be referred to as enhanced V2X (eV2X)) Layer 2 (L2) link establishment.

Vehicle-to-Everything (V2X) services, for example, as specified by 3rd Generation Partnership Project (3GPP) for 5th Generation (5G) networks (e.g., see Rel-16) may include a Layer-2 (L2) link establishment using (e.g., over, via, etc.) a PC5 reference point procedure. FIG. 2 illustrates a L2 link establishment using a PC5 reference point procedure that may be performed according to: (1) a WTRU oriented procedure, and (2) a V2X service oriented procedure.

In the case of the WTRU oriented procedure, an initiating WTRU (e.g., UE-2 in FIG. 2) broadcasts a Direct Communication Request (DCR) message, for example, which includes an upper layer identifier (ID) of a peer WTRU and source L2 ID of the initiating WTRU. The peer WTRU (e.g., UE-2 in FIG. 2) may decide to reply to the request with a unicast Direct Communication Accept (DCA) message using its L2 ID as the source L2 ID and the initiating UE L2 ID as the destination L2 ID. In the case of the V2X service oriented procedure, an initiating WTRU broadcasts a DCR message announcing a V2X service available for L2 link establishment. In such a case, (e.g., all) WTRUs that receive the DCR message and are interested in the announced V2X service may reply with a unicast DCA message to establish a unicast communication. An interested peer WTRU (e.g., UE-2 or UE-4 in FIG. 2) uses its L2 ID as the source L2 ID and the initiating WTRU L2 ID as the destination L2 ID.

Referring to FIG. 2, for example, such a eV2X procedure may be considered as (e.g. using) a (e.g., more) lightweight direct discovery mechanism that is (e.g., more) integrated with a link establishment procedure, for example, as compared to Release 12 (Rel-12) and Release 13 (Rel-13) Proximity Service (ProSe) direct discovery mechanism. In the eV2X procedure, for example, as shown in FIG. 2, peer WTRUs detect a service broadcast message without having to first request ProSe codes and/or filters from a network server. Such a eV2X procedure may be considered as a server-less procedure or more a distributed procedure, for example, as compared to Rel-12/Rel-13 ProSe direct discovery.

Figure 3:
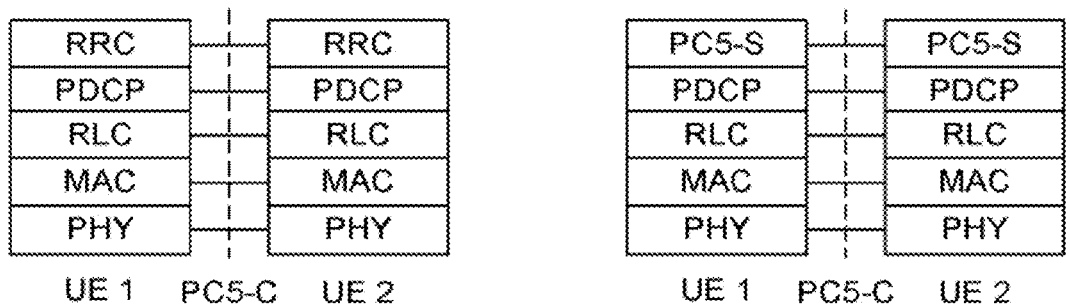
FIG. 3 is a diagram illustrating a control plane for eV2X in a PC5 interface.
Figure 4:
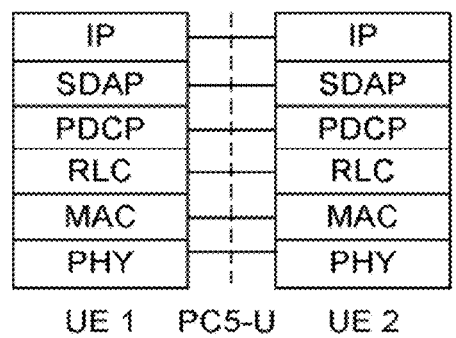
FIG. 4 is a diagram illustrating a user plane for eV2X in a PC5 interface.

FIG. 3 is a diagram illustrating a control plane for eV2X in a PC5 interface, and FIG. 4 is a diagram illustrating a user plane for eV2X in a PC5 interface. In further detail, FIG. 3 illustrates a control plane protocol for Access Stratum (AS) and PC5 layers for eV2X, and FIG. 4 illustrates a user plane protocol stack in a PC5 interface for eV2X.

Figure 5:
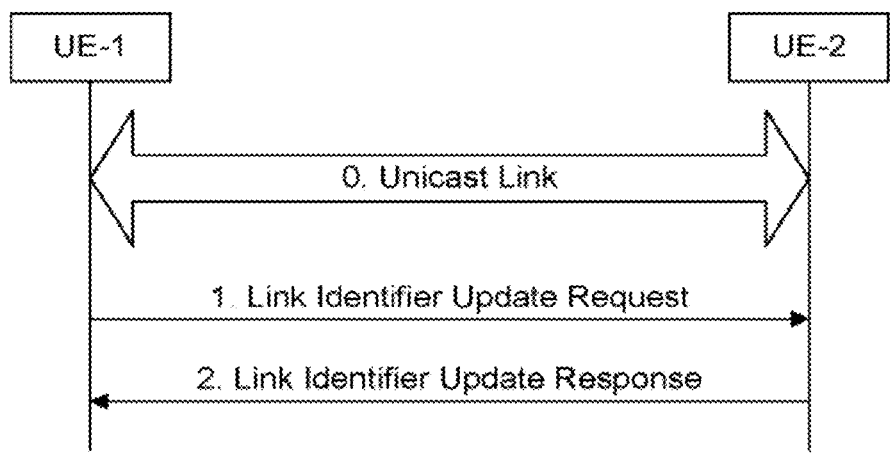
FIG. 5 is a diagram illustrating a link identifier update procedure.

FIG. 5 is a diagram illustrating a link identifier update procedure. A link identifier update (e.g., procedure) may be performed, for example, as defined by 3GPP, as shown in FIG. 5. In a case of a link identifier update shown in FIG. 5, due to privacy requirements (e.g., standards, needs, etc.), IDs (e.g., Application Layer ID, Source Layer-2 ID and IP address/prefix) used for a unicast mode of V2X communication over a PC5 reference point are changed overtime. In such a case, a Link Identifier Update Request specifying a new L2 ID is sent to a peer WTRU. The new L2 ID is sent as the message payload and is security protected. Once the peer WTRU sends a response message to acknowledge the reception of the new L2 ID, the new L2 ID may be used.

ProSe UE to UE Relay

Figure 6:
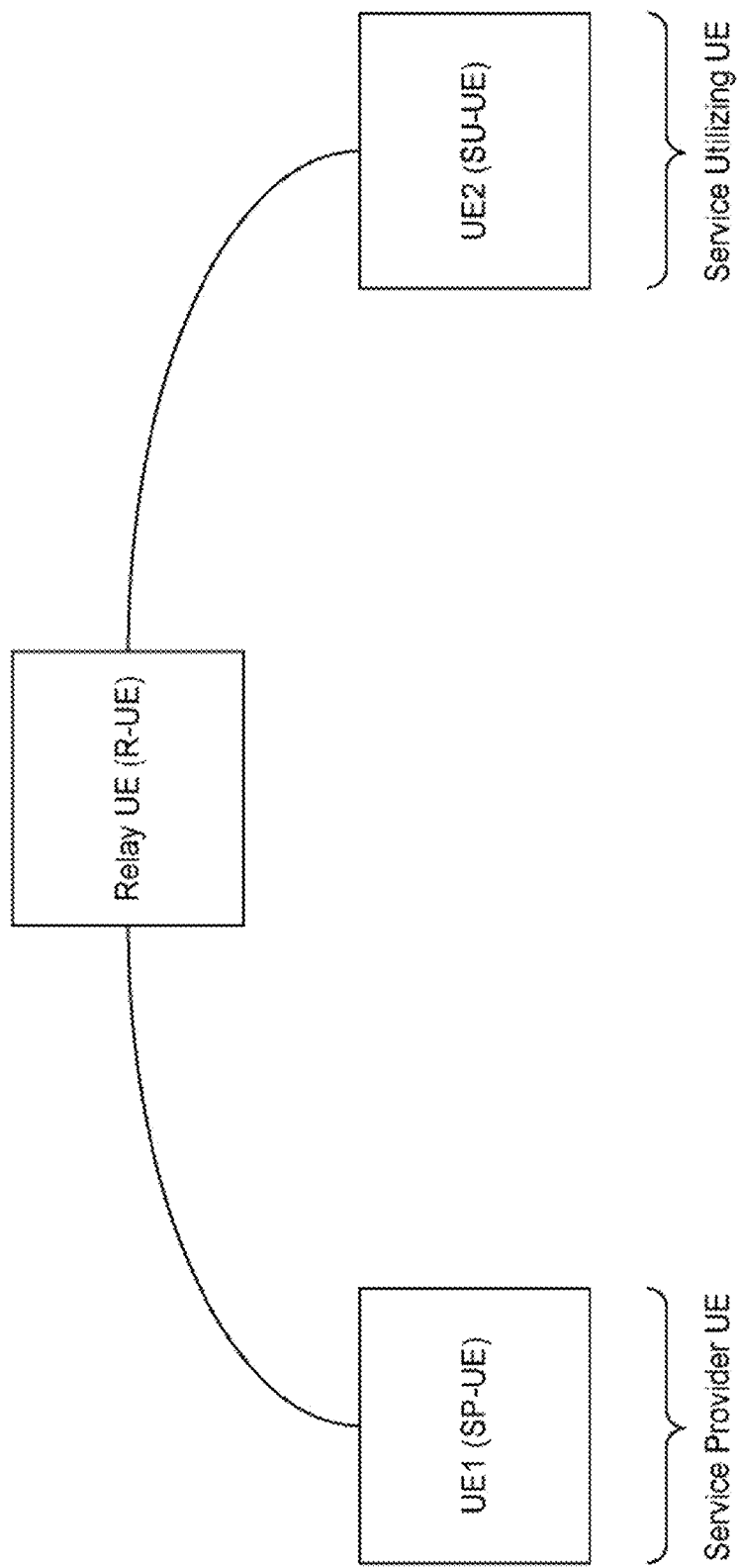
FIG. 6 is a diagram illustrating a WTRU to WTRU relay scenario.

FIG. 6 is a diagram illustrating a WTRU to WTRU relay scenario.

ProSe or proximity services may be applied to (e.g., are also being studied as part of) Release 17 (Rel-17) of the 3GPP 5G standards. Further, in a case of 5G ProSe, there is a (e.g., newly introduced) scenario for WTRU to WTRU communication using (e.g., via) a relay WTRU. In such a scenario, a WTRU discovers and (e.g., then subsequently) communicates with another WTRU via the relay WTRU in between the two (e.g., end-point) WTRUs. Referring to FIG. 6, a case of WTRUs communicating via a relay UE may include any of a service provider WTRU (SP-WTRU) (e.g., SP-WTRU, UE1 in FIG. 6), a service utilizing WTRU (SU-WTRU) (e.g. UE2 in FIG. 6), and a relay WTRU (R-WTRU).

A SP-WTRU offers a (e.g., certain) service (e.g., a restaurant service, a taxi service, a gaming console and/or gaming controller service, etc.) that is looked for by other WTRUs. A SU-WTRU may look for services offered by a service provider WTRU. There may any number of SU-WTRUs trying to discover services provided by a (e.g., particular) SP-WTRU. Examples of service utilizer WTRU may be, for example, a restaurant customer, a taxi passenger, any of (e.g., a user of any of) a gaming controller, an augmented reality (AR)/virtual reality (VR) headset, etc. A R-WTRU may relay (e.g., assist for) any of discovery messages and PC5 data communication between (e.g., two) other WTRUs (e.g., between a service provider WTRU and a service utilizing WTRU). A R-WTRU may (e.g., also) act as a proxy between the (e.g., two) other WTRUs for any of discovery and communication or may transparently relay the messages between the (e.g., two) other WTRUs. Further, a R-WTRU may be involved in the discovery process enabling a service provider WTRU and a service utilizing WTRU to discover each other.

As noted above, for example, with respect to 3GPP V2X standards work, Rel-16 eV2X work may be used (e.g., is expected to be re-used extensively) as a baseline for (e.g., studying) system enhancements for ProSe in a 5G System (5GS). Support for WTRU to WTRU relay may be considered a key issue (e.g., identified) for study. However, Rel-16 eV2X does not include support for WTRU to WRTU Relay, or in other words, doesn't support R-WTRUs.

According to embodiments, support of a WTRU to WTRU Relay feature (which may be referred to as any of a R-WTRU or R-UE feature) may be enabled in a 5GS. According to embodiments, for example, in order to enable the support of a R-WTRU or R-UE feature in a 5GS at least the following issues/questions may (e.g., must, need to, should, etc.) be addressed: (1) how does a WTRU (SP-WTRUE or SU-WTRU) discover an R-WTRUE in proximity?; (2) how does a WTRU (e.g., SU-WTRU) discover a peer WTRU (e.g., SP-WTRU) via an R-WTRU?; (3) how does the network authorize a WTRU to act as an R-WTRU and/or authorize peer WTRUs to provide and/or use a service through a relay?; and (4) how to enable a WTRU to check that an R-WTRU is authorized to act as a relay?

Further, according to embodiments, for example, in order to enable the support of a R-WTRU or R-UE feature in a 5GS there are security related issues/questions that may (e.g., must, need to, should, etc.) be addressed. For example, there may be a problem of how to provide security protection for communications when using a R-WTRU. According to embodiments, a solution for such may (e.g., should, must, aim to) provide a comparable level of security for peer WTRUs as when communicating without an R-WTRU. Further, regarding security, there may be a problem of how to provide privacy protection for communicating WTRUs when using a R-WTRU. According to embodiments, a solution for such may (e.g., should, must, aim to) provide a comparable level of privacy protection for peer WTRUs as when communicating without an R-WTRU.

According to embodiments, and as referred to herein, a SP-WTRU and a SU-WTRU may be used to identify or refer to peer WTRUs, and a SP-WTRU may also be referred to as any of an initiating WTRU, a source WTRU, and a peer WTRU, and a SU-WTRU may also be referred to as any of a responding WTRU, a target WTRU, and a peer WTRU.

Non-Transparent WTRU to WTRU Relay

According to embodiments, a relay WTRU (R-WTRU) may enable (e.g., provide for, facilitate, assist with, etc.) a service-user WTRU (SU-WTRU) to discover a service provided by a service-provider WTRU (SP-WTRU). According to embodiments, separate (e.g., two separate) L2 links may be (e.g., explicitly) set up, including a link between a SP-WTRU and a R-WTRU, and a link between the R-WTRU and a SU-WTRU, for example, to enables discovery. According to embodiments, a R-WTRU may be provisioned with (e.g., information indicating) any of relay policy and relay parameters, for example, by a Policy Control Function (PCF) at any of during or after a registration procedure. According to embodiments, any of the (e.g., information indicating) the relay policy and relay parameters may identify any of services and criteria that a R-WTRU may use, for example, to determine any of whether and how to act as a relay for a (e.g., given) service. According to embodiments, any of the relay policy and the relay parameters may also be considered (e.g., referred to) as being stored in a relay authorization context in the WTRU.

According to embodiments, in a case where (e.g., upon, when) a R-WTRU determines that a service broadcast by a SP-UE matches a service (e.g., one of the services) included in (e.g., associated with, from its, etc.) any of provisioned a relay policy and parameters, the R-WTRU may announce, for example, in a broadcast message, the service and may include (e.g., information indicating, in and/or along with the announcement) any of a SP-WTRU Application Layer ID (AID) and a relay indication, for example, in the broadcast message. According to embodiments, for example, upon receiving a reply in a unicast message from a SU-WTRU, a R-WTRU may send (e.g., include) a reply in a unicast message transmitted to a SP-WTRU. According to embodiments, the reply (e.g. transmitted as the unicast message) may include any of a relay indication and a SU-WTRU AID. According to embodiments, a R-WTRU may establishes a mapping of SP-WTRU and SU-WTRU identifiers, for example, for a (e.g., given) service. According to embodiments, the mapping may be established during a (e.g., current, executing, etc.) link establishment procedure and may be maintained, for example, for subsequent communications.

According to embodiments, a R-WTRU may use R-WTRU may use separate (e.g., two, different, etc.) L2 IDs, for example, two L2 IDs to respectively communicate with a SP-WTRU (e.g., L2 ID1) and a SU-WTRU (e.g., L2 ID2). According to embodiments, a R-WTRU send messages to a SP-WTRU over PC5. According to embodiments, in such a case, the R-WTRU may use its L2 ID1 (respective to a L2 ID2) as a source ID/address and may use a SP-WTRU (respective to a SU-WTRU) L2 ID as a destination ID/address when sending messages over PC5 to SP-WTRU (respective to a SU-WTRU). According to embodiments, the SP-WTRU may use its L2 ID as the source L2 ID and the R-WTRU L2 ID1 as the destination L2 ID. According to embodiments, the SU-WTRU may use its L2 ID as a source L2 ID and may use the R-WTRU L2 ID2 as a destination L2 ID.

Transparent WTRU to WTRU Relay

According to embodiments, transparent WTRU to WTRU relay may be considered as a variant of non-transparent WTRU to WTRU relay, for example, as described above. According to embodiments, for transparent WTRU to WTRU relay, a R-WTRU may not establish communication with any of a SU-WTRU or a SP-WTRU. According to embodiments, the R-WTRU may relay received messages (e.g., almost, essentially, largely, etc., unchanged) between a SU-WTRU and a SP-WTRU. According to embodiments, a R-WTRU may (e.g., at most, essentially, minimally, only, etc.) modify IDs, such as any of source and destination L2 IDs and an adaptation layer field. For example, according to embodiments, modifications may include any of: (1) replacing a source L2 ID being with a R-WTRU L2 ID, for example, before forwarding messages to any of a SP-WTRU or SU-WTRU; (2) modifying a destination L2 ID with any of a SU-L2 ID or a SP-L2 ID; (3) modifying an adaptation layer field with a R-WTRU L2 ID associated with any of a SU-WTRU and a SP-WTRU; and (4) addition of a relay WTRU indication (RIND). According to embodiments, the RIND may include a R-WTRU ID (RID).

According to embodiments, a SP-WTRU and a SU-WTRU may (e.g., securely) communicate via (e.g., through) a R-WTRU. According to embodiments, a SP-WTRU and a SU-WTRU may establish a (e.g., secured) communication via (e.g., going through) a R-WTRU. According to embodiments, a R-WTRU may be not involved in security context establishment. According to embodiments, in a case where a R-WTRU is not involved in security context establishment, the R-WTRU may not read and/or modify (e.g., may not be able to modify and/or read) content of a message, for example, that is secured (e.g., content for which integrity and/or confidentiality is protected). According to embodiments, any of source and destination L2 IDs may be sent as cleartext, and for example, may be read and/or modified by a R-WTRU.

According to embodiments, a R-WTRU performing transparent relay operation, which may be referred to as a transparent R-WTRU, may be provisioned with any of relay policy and relay parameters, for example, similar to the case of non-transparent relay (e.g., see above). According to embodiments, a R-WTRU may determine that a service broadcasted by a SP-WTRU in a DCR message matches (e.g., one of) a service based on (e.g., included in, from, indicated by, etc.) any of provisioned relay policy and parameters. According to embodiments, in a case where a R-WTRU determines that there is such a match, the R-WTRU may generate a (e.g., new) relay-L2 ID (R-L2 ID).

According to embodiments, a (e.g., new) R-L2 ID may be associated with any of a (e.g., this specific) DCR message and a SP-L2 ID, and any other messages (e.g. security context establishment message, link establishment accept message, etc.) related to a (e.g., this) link establishment request. According to embodiments, a (e.g., new) R-L2 ID may be included (e.g., saved, stored, written, etc.) in a mapping table, for example, together with the SP-WTRU L2 ID. According to embodiments, a R-WTRU may (e.g., then) copy the (e.g., newly) allocated R-L2 ID into a source L2 ID field of a received message and/or into an adaptation layer field of a received message and may add any of a relay indication (e.g., a RIND) and a relay identifier (e.g. RID). According to embodiments, a R-WTRU may (e.g., then) broadcast the (e.g., modified, received) message.

According to embodiments, a R-WTRU may do any of: locate (e.g., determine, find, calculate, etc.) a R-L2 ID in a (e.g., its own) mapping table; add a SU-L2 ID to a (e.g., its own) mapping table, and extract a SP-L2 ID from a (e.g., its own) mapping table. For example, upon receiving a unicast message from a SU-WTRU with the destination L2 ID field set to its R-L2 ID, a R-WTRU may generate a new Relay-L2 ID (R-L2 ID) to be associated with the SU-WTRU, may locate the R-L2 ID in its mapping table, may add the SU-L2 ID and associated new R-L2 ID to (e.g., in) this mapping table entry, and may extract a corresponding SP-L2 ID. According to embodiments, a R-WTRU may (e.g., then) copy the SP-L2 ID into a destination field of the received message and/or into an adaptation layer field of the received message, and/or may copy the R-L2 ID associated to SU-L2 ID into the adaptation layer field and may add a RIND. According to embodiments, the (e.g., modified, received) message may be (e.g., then) transmitted to a SP-WTRU. According to embodiments, a R-WTRU may maintain a mapping table containing any of SP-L2 IDs and SU-L2 IDs. According to embodiments, a R-WTRU may assign, for example to itself, (e.g., two) R-L2 IDs, for example, to be respectively associated with the SP-L2 ID and the SU-L2 ID. According to embodiments, a R-WTRU may replace (e.g., these) L2 IDs when relaying messages. According to embodiments, relay L2 IDs may be (e.g., also) preserved in a mapping table.

According to embodiments, in a case where a DCR message destined to a (e.g., known) WTRU (e.g., a DCR message having a destination addressed to a SP-L2 ID) is received by a R-WTRU, the R-WTRU may (e.g., as well) assign to itself a (e.g., new) R-L2 ID. According to embodiments, in such a case, the same steps as discussed above may be followed. That is, a R-WTRU may save (e.g., write, map, etc.) the source L2 ID included with (e.g., specified on) the received DCR message with the destination L2 ID (e.g. a SP-L2 ID) already saved in the mapping table. According to embodiments, the R-WTRU may update the source L2 ID of the received DCR message with its newly generated R-L2 ID and may forward the message to the destination L2 ID.

Figure 7:
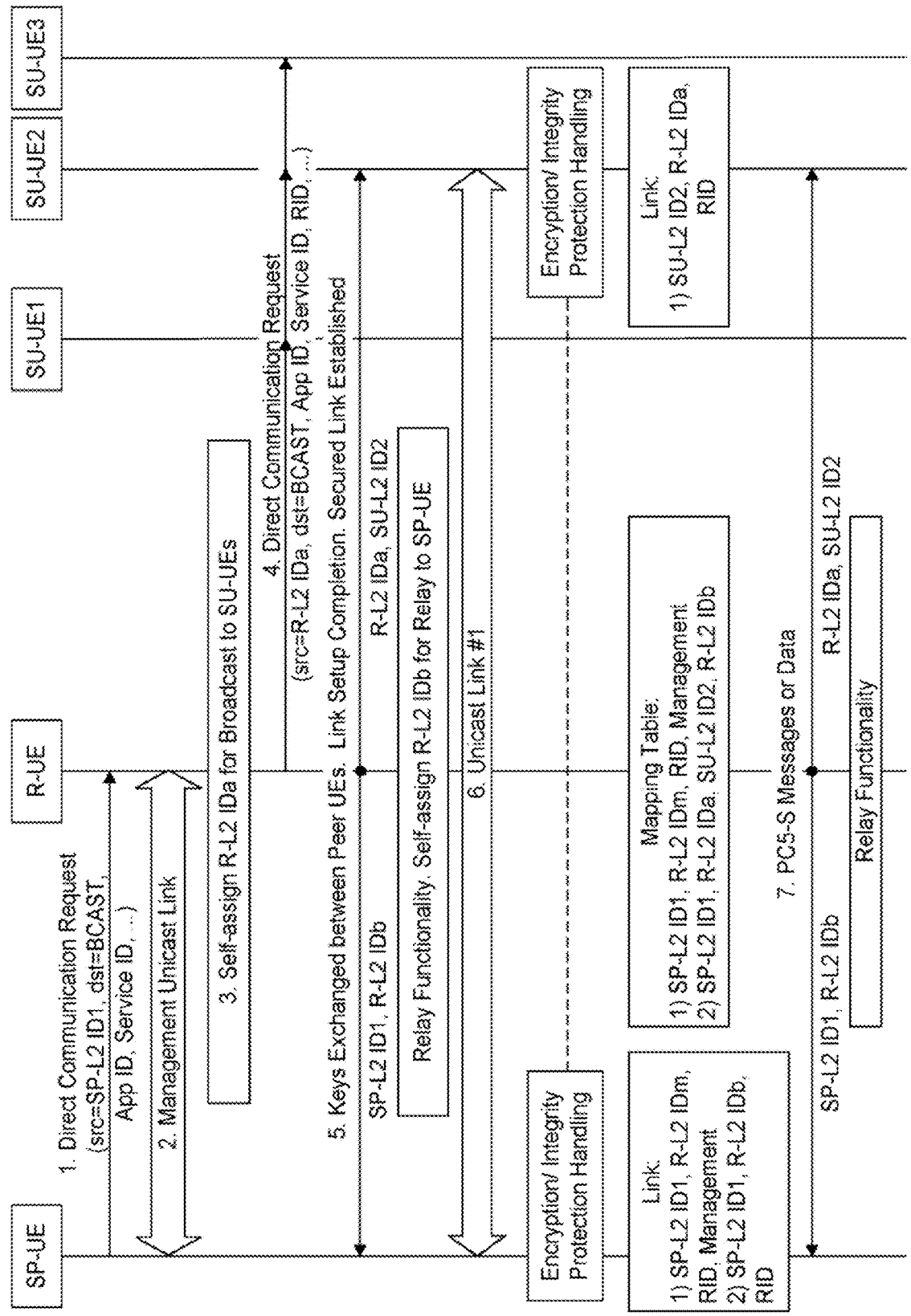
FIG. 7 is a diagram illustrating high-level view of transparent relay, according to embodiments.

FIG. 7 is a diagram illustrating high-level view of transparent relay, according to embodiments.

Referring to FIG. 7, according to embodiments, transparent relay may include any of the following operations: (1) a SP-WTRU may initiate peer WTRU discovery, for example, by broadcasting a DCR message announcing a supported service; (2) a management link may be established between a R-WTRU and a SP-WTRU, and the management link may be used to manage link established with SU-WTRUs via a R-WTRU; for example, a management link may be established by having the R-WTRU reply to the broadcasted DCR message, and/or, for example, the management link may be established (e.g., only) when needed (e.g., when link management is needed, to update a link ID on unicast link #1, etc.); (3) a R-WTRU assigns, for example, to itself, a R-L2 ID used as the source L2 ID to broadcast the received DCR message; (4) a R-WTRU may broadcast the DCR message, wherein, for example, (e.g., only) the source field of the DCR message is modified, and the content remains the same except for a RID that may be added, wherein the RID is a relay (e.g., R-WTRU) identifier that is unique to the (e.g., specific) R-WTRU; (5) a SU-WTRU (e.g., SU-UE2) may be interested in (e.g., by receiving) the announced service, and may exchange messages with SP-WTRU, via the R-WTRU, for example, to establish the link and setup a security context (e.g., keys for integrity protection and encryption); according to embodiments, these messages are not modified by the R-WTRU, and (e.g., only) source/destination fields (e.g., source/destination L2 IDs) are modified; for example, the R-WTRU may forward SMC messages including keying material exchanged between a SP-WTRU and SU-WTRU such that SP-WTRU and SU-WTRU may derive security keys for end to end communication security; further, the SP-WTRU may know the L2 ID of the R-WTRU and the SU-WTRU may know another L2 ID of the R-WTRU, while the SP-WTRU and the SU-WTRU don't know each other's L2 ID; (6) a secured unicast link may be established between the SP-WTRU and the SU-WTRU via the R-WTRU, and, according to embodiments, security settings (e.g., integrity and/or confidentiality protection) may be handled at the SP-WTRU and the SU-WTRU; and (7) any of PC5-S messages and data may be exchanged between the SP-WTRU and the SU-WTRU via the R-WTRU, and, according to embodiments, a R-WTRU may (e.g., only) update source and/or destination L2 IDs based on the information saved in its mapping table.

IP Based Service-Oriented Discovery and Groupcast Communications Using a WTRU to WTRU Relay According to embodiments, a WTRU to WTRU relay (e.g., a R-WTRU) may use Internet Protocol (IP) for supporting discovery and unicast communications. That is, according to embodiments, a R-WTRU (e.g., operating as a WTRU to WTRU relay) may use IP based mechanisms to (e.g., provide) support (e.g., only) for WTRU oriented discovery and unicast (e.g., IP/L2) communications. Further, according to embodiments, support for any of service-oriented discovery and groupcast (e.g., IP/L2) communications may be used (e.g., desired) by a R-WTRU (e.g., may be used for the WTRU to WTRU Relay), for example, to extend the range of all possible types of discovery and communications.

According to embodiments, there may be a case where (e.g., a use case scenario), for any of service-oriented discovery or groupcast (e.g., IP/L2) communications, a transmitting WTRU may not know (e.g., does not know, does not need to know, etc.) about a receiving (e.g., target) WTRU. For example, in use cases such as group and/or real time gaming, a transmitting WTRU may not need to know about receiving WTRUs. According to embodiments, any of IP based service-oriented discovery and groupcast communications may be performed (e.g., enabled) using a R-WTRU (e.g., a WTRU to WTRU relay) acting as a non-transparent IP based relay between WTRUs, such as, for example, a first WTRU (e.g., a service provider WTRU, WTRU 1) and second (WTRU 2) and third (WTRU 3) WTRUs (e.g., service utilizer WTRUs).

According to embodiments, a R-WTRU may perform IP based service-oriented discovery and groupcast communications using any of the operations and features described below. According to embodiments, a WTRU (e.g., a R-WTRU) may broadcast (e.g., an announcement, a message for, etc.) an IP based WTRU to WTRU relay service over PC5, the broadcast including information indicating groupcast communications relaying capabilities. According to embodiments, WTRUs (e.g., any of WTRUs 1 to 3) may discover (e.g., start discovery of) a R-WTRU (e.g., WTRU to WTRU relay), for example, based on application layer trigger. According to embodiments, the WTRUs (e.g., any of WTRUs 1 to 3) may select (e.g., to use) a relay based on the information indicating groupcast communications relaying capabilities. According to embodiments, a R-WTRU may establish a secure link with a service provider WTRU (e.g., WTRU 1), for example, upon receiving a unicast DCR message including a service info (e.g., and an empty target user info).

According to embodiments, a R-WTRU may allocate, for example, for WTRU 1 (e.g. a service provider WTRU) any of a unicast IP address, an IP multicast and associated L2 groupcast address for the service (e.g. based on service info, authorization). According to embodiments, a R-WTRU may send a DCA message to WTRU 1, and the DCA message may include the unicast IP address and IP multicast/L2 groupcast addresses for the service. According to embodiments, a R-WTRU may create (e.g., generate, update, etc.) a mapping including service info, UE1's IP/L2 unicast addresses and IP multicast/L2 groupcast addresses for the service. According to embodiments, a R-WTRU may establish (e.g., generate, determine, etc.) restrictions on which WTRU may use (e.g., send to, transmit using, etc.) any of the IP multicast address and L2 groupcast address for the service. For example, a R-WTRU may restrict use of the addresses to (e.g. only) WTRU 1 or some designated WTRUs, based on any of WTRU 1 request and/or service information and provisioned authorization policy.

According to embodiments, a R-WTRU may listen to the L2 groupcast address for the service to receive groupcast communication from any of the participating WTRUs (e.g., WTRUs 1 to 3). According to embodiments, a R-WTRU may establish a secure link with a service utilizing WTRU (e.g., WTRUs 2 and 3), for example, upon receiving a unicast DCR message including any of empty service information and empty target user information. According to embodiments, a DCR message may include one or more (e.g., any number/amount of) service information that the service utilizing WTRU is interested in. According to embodiments, a R-WTRU may allocate, for any of WTRU 2 and WTRU 3, a unicast IP address and (e.g., respectively) may send it to any of WTRU 2 and WTRU 3 in a DCA message. According to embodiments, in a case where one or more service information are indicated by a service utilizing WTRU in a DCR message, a R-WTRU may also include a WTRU 1 IP unicast address and any of an IP multicast address and a L2 groupcast address for the one or more services requested in the DCA. According to embodiments, in a case of multiple R-WTRUs, a service utilizing WTRU may select an R-WTRU that provides these addresses for the service in the DCA (e.g., the service utilizing WTRU may use a direct connection with the first R-WTRU that includes the service addresses in the DCA). According to embodiments, a R-WTRU may receive a Domain Name System (DNS) query from any of WTRU 2 and WTRU 3, and the DNS query may include the service info. According to embodiments, the R-WTRU may transmit (e.g., in response to the DNS query) a DNS response, for example, including a WTRU 1 IP unicast address and any of IP multicast and L2 groupcast addresses for the service.

According to embodiments, for example, upon receiving the DNS reply, any of WTRU 2 and WTRU 3 may listen to L2 groupcast and IP multicast for the service. According to embodiments, for example, upon receiving an IP packet with the service's IP multicast as the destination (e.g. an IP packet from WTRU 1) in an inbound L2 message, a R-WTRU may forward the IP packet in an outbound message, for example, using the L2 groupcast address for the service as a destination. According to embodiments, the inbound message may use any of the R-WTRU's L2 unicast address (e.g., may be sent to the R-WTRU over the unicast link) or the L2 groupcast address for the service (e.g. may be sent to the group) as a L2 destination, so that, for example, any of WTRU 2 and WTRU 3 receives the IP packet.

Figure 8:
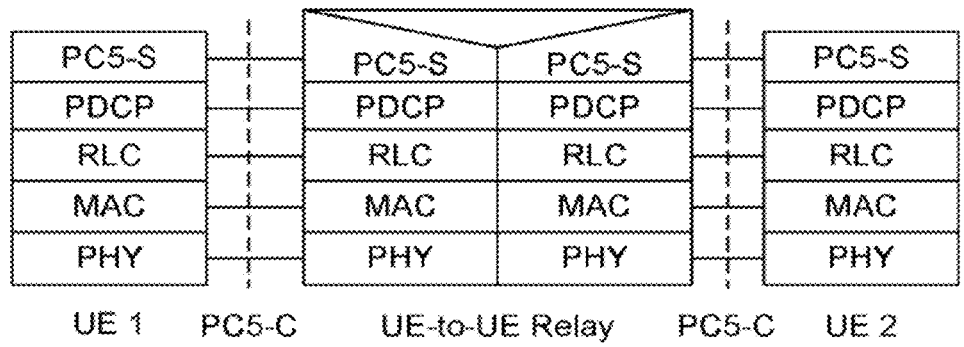
FIG. 8 is a diagram illustrating control plane protocol stacks supporting a non-transparent WTRU to WTRU relay, according to embodiments.

Service Oriented Discovery and Communication Using a Non-Transparent WTRU to WTRU Relay Control and User Plane Stacks for Non-Transparent Relay FIG. 8 is a diagram illustrating control plane protocol stacks supporting a non-transparent WTRU to WTRU relay, according to embodiments.

According to embodiments, referring to FIG. 8, there may be control plane protocol stacks supporting a R-WTRU, which may be interchangeably referred to as a non-transparent WTRU-to-WTRU relay. According to embodiments, for example, as described above, a hop by hop (e.g., between a WTRU1 and a R-WTRU, and between the R-WTRU and a WTRU2) link and security establishment may be used. According to embodiments, a R-WTRU may use its own (e.g., self-generated) source L2 IDs and may build L2 frames for a WTRU (e.g., towards WTRU1 respective to WTRU2) upon receiving frames from another WTRU (e.g., from WTRU2 respective to WTRU1), for example, based on maintained relay information mapping WTRU1 and WTRU2 L2 IDs.

According to embodiments, a R-WTRU may process the security of PC5 signaling packets on a per link basis, for example, using the security context established for that particular link. According to embodiments, a R-WTRU may perform actions upon receiving a PC5-S message from a first WTRU destined to a second WTRU (or vice versa). That is, according to embodiments, a R-WTRU may perform any of the following: (1) check (e.g., review, determine, verify, etc.) integrity protection and/or decrypt a protected PC5-S packet using a security context established with a first WTRU; (2) any of modify or generate a corresponding PC5-S message (e.g., to include relay indication information element (IE)); (3) apply security, using the security context established with a second WTRU, on that packet; and (4) set the source L2 ID to a R-WTRU's own source L2 ID and a L2 destination to the second WTRU's L2 ID and send it to the second WTRU.

Figure 9:
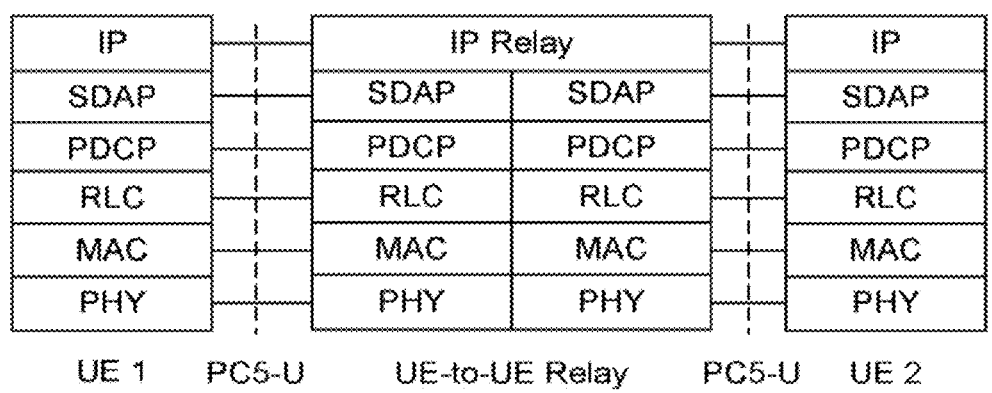
FIG. 9 is a diagram illustrating user plane protocol stacks supporting a non-transparent WTRU to WTRU relay, according to embodiments.

FIG. 9 is a diagram illustrating user plane protocol stacks supporting a non-transparent WTRU to WTRU relay, according to embodiments.

According to embodiments, referring to FIG. 9, there may be user plane protocol stacks supporting a R-WTRU (e.g., a non-transparent WTRU-to-WTRU relay). According to embodiments, a R-WTRU may be (e.g., act as) a default IP router for WTRUs for which it is a relay, for example, for any of both the first and second WTRUs discussed above. According to embodiments, a R-WTRU may (e.g., automatically) forward IP packets received on a (e.g., given) link (e.g., to the R-WTRU) over an associated link (e.g., from the R-WTRU), for example, based on relay mapping information. According to embodiments, regarding a control plane, a R-WTRU may processes the security of incoming IP packets on a per link basis. For example, a R-WTRU may check integrity protection and/or decrypt an IP packet received on a link with a first WTRU using the security context established for that link with first WTRU. According to embodiments, a R-WTRU may (e.g., then) apply security on that packet and may send the secured packet to a second WTRU in an L2 frame using a source L2 ID as the R-WTRU's own source L2 ID and a L2 destination as the second WTRU's L2 ID.

Link Establishment for Non-Transparent Relay

According to embodiments, a R-WTRU may enables discovery, by a SU-WTRU, of a service provided by a SP-WTRU. According to embodiments, (e.g., two) separate L2 links may be (e.g., explicitly) setup, for example, a link between the SP-WTRU and the R-WTRU and a link between the R-WTRU and the SU-WTRU. However, the present disclosure is not limited thereto, and any number of L2 links may be setup (e.g., configured, operated, etc.), for example, by a R-WTRU.

R-WTRU Behavior for Non-Transparent Relay

According to embodiments, a WTRU may signal relay capabilities, for example, to a network during registration of the WTRU. According to embodiments, a WTRU may receive authorization to act as a relay, for example, via (e.g., using, by, according to, etc.) the provisioning of any of relay policy and relay parameters, for example, by the PCF. According to embodiments, a WTRU may be authorized to act as a relay (e.g., as a R-WTRU) on any of a per service, per PLMN, or per RAT basis. According to embodiments, the provisioned parameters (e.g., part of a relay authorization context) for relay operations may include any of the following: (1) a list of any of services or service types a WTRU is authorized to relay; (2) relay availability criteria, for example, any of a registration area, a geographical area, a time of day for where or when the WTRU may act as a relay for a (e.g., particular) service; and (3) relay security parameters, for example, a signed certificate that the WTRU may use to provide as a proof of authorization to relay to peer WTRUs (e.g., any of a SP-WTRU and a SU-WTRU) that wish to use the relay service, and according to embodiments, such relay security parameters may be (e.g., also, alternatively) provided by an application layer of the WTRU. According to embodiments, a WTRU may receive a broadcast DCR message announcing a (e.g., given) service. According to embodiments, a broadcast DCR message may include an indication whether the service may be used through a relay. According to embodiments, any of a broadcast DCR message or a similar PC5 message may be received over the PC5 discovery channel.

According to embodiments, a WTRU may match an announced service with one of the services from its provisioned relay policy/parameters. According to embodiments, a WTRU may invoke mutual authentication with a SP-WTRU and may establish security for the PC5 link, for example, after matching an announced service. According to embodiments, a WTRU may store relay mapping information, for example, including any of a SP-WTRU L2 ID and a SP-WTRU Application Layer ID (AID) for any of the announced service or service type. According to embodiments, a WTRU may broadcast a DCR including any of an indication that the WTRU operates as a Relay (e.g., as a R-WTRU) and an SP-WTRU AID for the announced service. According to embodiments, a WTRU may perform a mutual authentication with a SU-WTRU and security establishment for the PC5 link, for example, after broadcasting the DCR. According to embodiments, upon receiving a DCA from a SU-WTRU, a WTRU may update its relay mapping information with an L2 ID and an AID of the SU-WTRU. According to embodiments, a WTRU may sends a DCA to SP-WTRU, for example, including any of a RIND and a SU-WTRU AID, for example, using a stored SP-WTRU L2 ID as a destination L2 ID.

SU-WTRU Behavior for Non-Transparent Relay

According to embodiments, a WTRU may be provisioned with any of relay policy and relay parameters by the PCF. The provisioned parameters for relay operations (e.g., part of a relay user authorization context) may include any of the following: a list of any of services and service types a WTRU may use via a relay (e.g., a R-WTRU); any of relay availability and selection criteria; PC5 QoS parameters for relayed services; and relay security parameters. According to embodiments, any of relay availability and selection criteria may include any of registration area, geographical area, and time of day constraints, for example, for where or when usage of a relay (e.g., a R-WTRU) for a (e.g., particular) service may be allowed. According to embodiments, a relay policy may indicate how the service may be utilized when a SP-WTRU, a R-WTRU and a SU-WTRU are (e.g., all) in range of one another. According to embodiments, any of a connection to (e.g., both) a SP-WTRU and a R-WTRU (e.g., as a backup to the SP-WTRU) may be allowed or a connection to only (e.g., one) a SP-WTRU may be allowed.

According to embodiments, PC5 QoS parameters for relayed services may be default QoS values for any of services or service types that may be (e.g., specifically) adapted for usage (e.g., transmission) via a relay (e.g., a R-WTRU). According to embodiments, some values (e.g., default QoS values, PC5 QoS parameters) may be the same as when using the service directly (e.g., without a relay), while others may vary (e.g., a Packet Delay Budget parameter may be higher when a service is used via a relay). According to embodiments, PC5 QoS parameters may include any of a maximum relay range or distance from the relay, for example, which may not be exceeded for using (e.g., to be able to use) service via the relay. According to embodiments, relay security parameters may include an authorization token. According to embodiments, a WTRU may use an authorization token to check (e.g., determine, verify, calculate, etc.) proof of authorization to provide a relay service from an R-WTRU. According to embodiments, a security parameter may be (e.g., alternatively) provided by an application layer of a WTRU.

According to embodiments, a WTRU (e.g., a R-WTRU) may receive a broadcast DCR announcing a given service. According to embodiments, a WTRU may (e.g., optionally) monitor a discovery channel, for example, to receive a broadcast DCR message, for example, in a case where the broadcast DCR message (which may be interchangeably referred to as any of a DCR message and a DCR) sent as PC5 discovery message. According to embodiments, a WTRU may determine that a DCR originates from a R-WTRU (e.g., on behalf of a SP-WTRU), for example, based on a (e.g., included) relay indication (e.g., any of a RIND or a RID). According to embodiments, a WTRU may check (e.g., determine, verify, calculate, etc.) that a R-WTRU is authorized to act as a relay, for example, using provisioned security parameters, such as an authorization token.

According to embodiments, a WTRU may determine that a service may be used through a relay based on provisioned any of relay policy and relay parameters (e.g., the service to be used matches a service from (e.g., a list of) services authorized to be used via a relay in a current registration area). According to embodiments, a WTRU may invoke mutual authentication with a R-WTRU and (e.g., may perform) security establishment for a PC5 link, for example, after matching a service. According to embodiments, (e.g., optional, additional, etc.) a R-WTRU may be used for performing (e.g., steps of, parts of, etc.) mutual authentication and security establishment of the end to end communications between a SP-WTRU and a SU-WTRU. According to embodiments, a WTRU may sends a DCA to a R-WTRU, for example, to complete establishment of a L2 link for a relayed service.

SP-WTRU Behavior for Non-Transparent Relay

According to embodiments, a WTRU may be provisioned with any of relay policies and relay parameters, for example, by a PCF. According to embodiments, any of provisioned policies and parameters (e.g., part of a relay user authorization context) may include criteria for relay usage (e.g., operations) for a SU-WTRU. According to embodiments, a WTRU may send a broadcast DCR message announcing a (e.g., particular) service. According to embodiments, a broadcast DCR message (e.g., sent by a WTRU) may include information indicating whether a service (e.g., which services) may be relayed based on (e.g., according to) any of the provisioned relay policies and relay parameters. According to embodiments, a WTRU may use (e.g., such) an indication to dynamically restrict (e.g., based on policy) any of when or where a service may be relayed. According to embodiments, a broadcast DCR message may be a PC5 discovery message, for example, sent over the discovery channel.

According to embodiments, a WTRU may perform a mutual authentication with a R-WTRU. According to embodiments, a WTRU may perform a security establishment for a PC5 link, for example, after performing mutual authentication with a R-WTRU. According to embodiments, a WTRU may determine that a service is being used by a SU-WTRU through a R-WTRU, for example, upon receiving a DCA from the R-WTRU, and/or based on any of an included relay indication (e.g., RIND, RID) and a SU-WTRU AID. According to embodiments, a WTRU may perform a (e.g., final) check to determine if a service may be relayed, for example, based on any of provisioned relay policy or relay parameters.

Call Flow for Non-Transparent Relay

Figure 10:
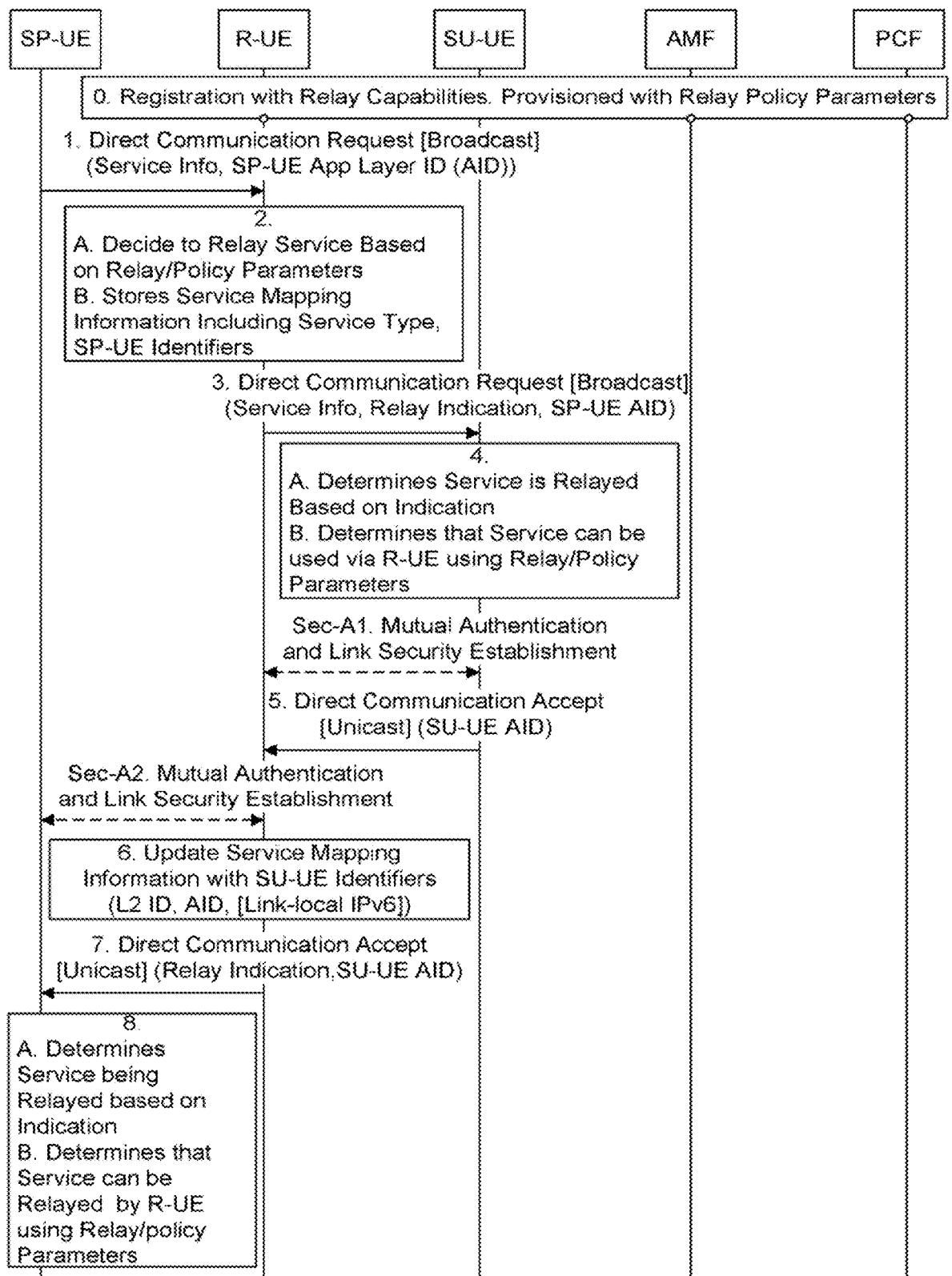
FIG. 10 is a diagram illustrating a service oriented discovery procedure using a non-transparent WTRU to WTRU relay, according to embodiments.

FIG. 10 is a diagram illustrating a service oriented discovery procedure using a non-transparent WTRU to WTRU relay, according to embodiments.

Referring to FIG. 10, according to embodiments, procedures for a non-transparent WTRU to WTRU relay, that is, procedures performed by a R-WTRU may be any of a service oriented discovery and a link establishment procedure involving any of the R-WTRU, an SP-WTRU, and an SU-WTRU. According to embodiments, any of a service oriented discovery and a link establishment procedure may include any of the following operations 0 through 9 (e.g., may follow the call/signal flow of FIG. 10).

According to embodiments, at operation 0, a R-WTRU may register with a network, and the R-WTRU may indicate relay capabilities, for example, when registering with the network. According to embodiments, a R-WTRU may receive (e.g., from a PCF via an AMF) any of relay policies or relay parameters, for example, to perform (e.g., operations) as a relay. According to embodiments, a SP-WTRU and a SU-WTRU may (e.g., also) registered with a network and may be provisioned with any of relay user policies or relay (e.g., user) parameters, for example, to perform (e.g., operations) as users of a relay. According to embodiments, any of relay policies and relay parameters for a relay and users of relay are described above. According to embodiments, a WTRU (e.g., all three or any of a R-WTRU, a SU-WTRU, or a SP-WTRU) may be (e.g., alternatively or additionally) pre-provisioned with any of (e.g., their respective) relay policy or relay parameters. According to embodiments, any of such parameters may be (pre-)provisioned into any of the Mobile Equipment (ME) and Universal Integrated Circuit Card (UICC) part of the WTRU.

According to embodiments, at operation 1, a SP-WTRU may send a DCR in a broadcast message, for example, to announce a (e.g., particular) service. According to embodiments, a SP-WTRU may include an indication restricting relaying of the service. For example, a SP-WTRU may (e.g., wish to) prioritize usage by SU-WTRUs in close range (e.g., in an area with a high density of SU-WTRUs in range). According to embodiments, a SP-WTRU may inform relays (e.g., R-WTRUs) that relaying the service is barred (e.g., temporarily, based on off vs on peak hours).

According to embodiments, at operation 2, for example, upon receiving a broadcast DCR message announcing a given service, a R-WTRU may determine that it may act as a relay for the service (e.g., may provide relay for the service provided by the SP-WTRU), for example, based on any of a relay restriction indication or the R-WTRU's provisioned relay policy and/or relay parameters. According to embodiments, an announced service and/or service type may be matched to a provisioned service and/or service type that a R-WTRU may be authorized to relay. According to embodiments, a R-WTRU may store relay mapping information, for example, including any of a service type, a L2 ID and a AID of SP-WTRU, R-WTRU L2 ID and any IP address and QoS information received in the DCR message.

According to embodiments, at operation 3, a R-WTRU may broadcast a DCR including any of a service and a service type received from a SP-WTRU, an indication that the R-WTRU may operates as a Relay and a SP-WTRU AID. According to embodiments, a R-WTRU may include other parameters, such as a locally formed IP address, in a broadcast DCR.

According to embodiments, at operation 4, for example, upon receiving a broadcast DCR message announcing a (e.g., given) service, a SU-WTRU may determine that the broadcast DCR message originates from an R-WTRU (e.g., on behalf of a SP-WTRU), for example, based on a relay indication included in the broadcast DCR. According to embodiments, a SU-WTRU may determine that it may use the announced service via the relay, for example, based on any of its provisioned relay policy or relay parameters (e.g., the SU-WTRU may match a service from among services, for example, a list of services, authorized to be used via relay in a current registration area). According to embodiments, a SU-WTRU may check that a R-WTRU is authorized to act as a relay using the provisioned security parameters (e.g., an authorization token).

According to embodiments, in a case where a SU-WTRU is in range of both a R-WTRU and a SP-WTRU, the SU-WTRU may decide whether to establish a connection, for example, based on any of the provisioned relay policy or relay parameters, via the R-WTRU in addition to a connection with the SP-WTRU. For example, in a case where a SU-WTRU has an existing connection with a SP-WTRU, the SU-WTRU may not proceed with the operations 5-8 with the R-WTRU. According to embodiments, (e.g., as an alternative) a SU-WTRU may proceed with the rest of the procedure and may establish a link with the R-WTRU, for example, as a backup to the existing connection (e.g., link) already established with the SP-WTRU. According to embodiment, (e.g., conversely) a SU-WTRU may decide to release or maintain a link with a R-WTRU if a link with a SP-WTRU is established afterwards based on the provisioned relay policy/parameters.

According to embodiments, (e.g., at operation [Sec-A1]) a SU-WTRU may perform a mutual authentication and link security establishment procedure with the R-WTRU. According to embodiments, the S-WTRU may not (e.g., does not, cannot, etc.) proceed with service oriented discovery and a link establishment procedure in a case where the mutual authentication and link security establishment procedure does not complete successfully (e.g., if a S-WTRU is unable to authenticate the R-WTRU or establish proper security of the link).

According to embodiments, at operation 5, the SU-WTRU may send a DCA unicast message to R-WTRU to confirm establishment of a L2 link to be used for the relayed service. According to embodiments, (e.g., at operation [Sec-A2]) a R-WTRU may perform a mutual authentication and link security establishment procedure with a SP-WTRU. According to embodiments, the R-WTRU may discard any related stored relay mapping information and may not proceed with next steps in a case where the mutual authentication and link security establishment procedure does not complete successfully (e.g., if the R-WTRU is unable to authenticate the SP-WTRU or establish proper security of the link).

According to embodiments, at operation 6, for example, upon receiving a DCA from the SU-WTRU, the R-WTRU may updates the relay mapping information to include any of a L2 ID and an AID of the SU-WTRU. According to embodiments, at operation 7, a R-WTRU may send a DCA unicast message to a SP-WTRU including any of a relay indication (e.g., a RIND, a RID) and a SU-WTRU AID, using the SP-WTRU L2 ID retrieved from the relay mapping information as a destination L2 ID.

According to embodiments, at operation 8, for example, upon receiving a DCA unicast message, the SP-WTRU may determine that the DCA unicast message originates from an R-WTRU (e.g., on behalf of a SU-WTRU), for example, based on an included relay indication (e.g., RIND, RID). According to embodiments, it is contemplated that the relay indication may be provided in an earlier message, for example, during any of mutual authentication or security establishment. According to embodiments, the SP-WTRU may determine that the announced service may be relayed via the R-WTRU based on any of its provisioned relay policy or relay parameters (e.g., indicating any of relaying being allowed in the current registration area, no relay restriction in effect, etc.).

According to embodiments, in a case where the SP-WTRU is in range of both the R-WTRU and the SU-WTRU, the SP-WTRU may decide, for example, based on any of its provisioned relay policy or relay parameters, whether to allow establishment of a connection via the R-WTRU in addition connections with an SU-WTRU. For example, if a SU-WTRU has an existing connection with an SP-WTRU, then the SP-WTRU may not proceed with link establishment with a R-WTRU.

According to embodiments, (e.g. as an alternative to a signal flow of FIG. 10), a R-WTRU may (e.g., first) setup a link (e.g., link 1) with SP-WTRU (e.g., operations 1, 2, Sec-A1, and 7) before setting up another link (e.g., link 2) with an interested SU-WTRU (e.g., operations 3-6). According to embodiments, in such a case, the relay mapping information may not (e.g., initially) include any SU-WTRU related information (e.g., L2 ID) and a R-WTRU may discard any service data coming from a SP-WTRU, for example, while no SU-WTRU is connected to the R-WTRU. According to embodiments, (e.g., upon successful establishment of link 1) the R-WTRU may decide to broadcast DCR on behalf of a SP-WTRU (e.g., message 3 in FIG. 10).

According to embodiments, (e.g., upon receiving a DCA from a SU-WTRU (e.g., message 5 in FIG. 10), a R-WTRU may update the relay mapping information to include any of SU-WTRU or link 2 information (e.g., operation 6). According to embodiments, service data may be relayed between a SP-WTRU and a SU-WTRU via the R-WTRU, for example, after updating the relay mapping information. According to embodiments, a R-WTRU may repeat a process of establishing a new link and waiting for an interested SU-WTRU to connect before relaying service information. According to embodiments, a R-WTRU may perform checks to limit how many link(s) are pre-established with a SP-WTRU, for example, based on the received DCR message content (e.g., any of a source L2 ID, Application Layer ID, and service). According to embodiments, in a case where a R-WTRU has already pre-established a link for a service A with a SP-WTRU, but no SU-WTRUs are connected to a R-WTRU for service A, then the R-WTRU may (e.g., does) not attempt to create a new link with the SP-WTRU.

Link Management for Non-Transparent Relay

According to embodiments, a link identifier update may be performed for a unicast link using a non-transparent WTRU to WTRU relay (e.g., a R-WTRU).

In a case of a R-WTRU connected to a first WTRU (e.g., UE1) via a first PC5 link (e.g., link 1) and a second WTRU (e.g., UE2) via a second PC5 link (link 2), using the existing (e.g. a conventional) Link Identifier Update procedure (e.g., see above) independently on each link may pose potential risks to privacy for WTRU identifiers. An attacker may attempt to correlate L2 frames (and included L2 IDs) exchanged over one link with a frame exchanged over the other. For example, an attacker may perform traffic analysis to infer that some L2 frames transmitted on link 1 are triggering L2 frames on link 2 (e.g., traffic from the first WTRU (UE1) to the second WTRU (UE2)) and associate the corresponding L2 IDs (first WTRU, R-WTRU, second WTRU) used across the two links. In such a case, if the R-WTRU performs the conventional Link Identifier Update procedure on link 1 (while identifiers used on link 2 are kept unchanged), the attacker may be able to link old and new identifiers on link 1 indirectly through the unchanged identifiers on link 2.

According to embodiments, for example, in order to mitigate risks noted above, a R-WTRU may any of coordinate or synchronize a change of L2 IDs across links (e.g., link 1 and link 2) so that new L2 IDs on a first link are always used in conjunction with new L2 IDs on a second link (and use the old L2 IDs on link 1 with old ones on link 2).

Figure 11:
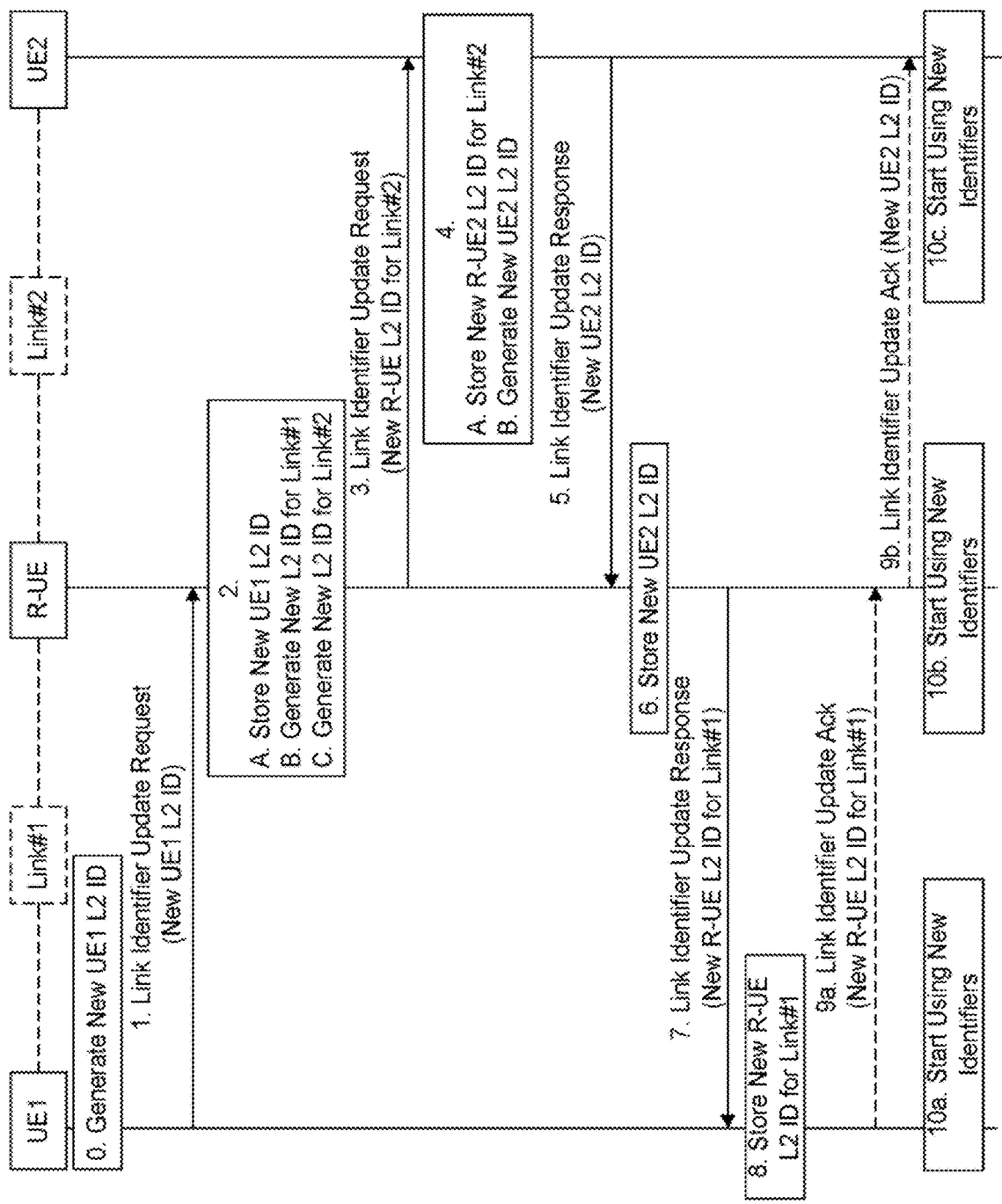
FIG. 11 is a diagram illustrating an enhanced Link Identifier Update procedure using a non-transparent R-WTRU, according to embodiments.

FIG. 11 is a diagram illustrating an enhanced Link Identifier Update procedure using a non-transparent R-WTRU, according to embodiments.

According to embodiments, in an exemplary enhanced Link Identifier Update procedure, secure PC5 unicast links may be (e.g., are assumed to be) established between a first WTRU and a R-WTRU and the R-WTRU and a second WTRU, respectively. According to embodiments, WTRUs are assumed to exchange all their signaling messages shown in FIG. 11 with confidentiality, integrity and replay protection.

According to embodiments, at operation 1101, a first WTRU (e.g., UE1) may initiates a Link Identifier Update procedure with a R-WTRU by sending the R-WTRU a newly generated UE1 L2 ID in a Link Identifier Update Request message. According to embodiments, at operation 1102, a R-WTRU may store the new UE1 L2 ID and may generate new source L2 IDs to be respectively used over Link #1 and Link #2. According to embodiments, at operation 1103 (e.g., in contrast to conventional link update procedures), the R-WTRU may initiate another Link Identifier Update procedure with a second WTRU (e.g., UE2) for Link #2 before replying to the first WTRU request. According to embodiments, the R-WTRU may send the second WTRU the new R-WTRU L2 ID for Link #2 in a Link Identifier Update Request message. According to embodiments, at operation 1104, the second WTRU may store the new R-WTRU L2 ID for Link #2 and generate a new UE2 L2 ID. According to embodiments, at operation 1105, the second WTRU sends the new UE2 L2 ID in a Link Identifier Update Response message.

According to embodiments, at operation 1106, for example, upon receiving the Link Identifier Update Response message, the R-WTRU may store the new UE2 L2 ID. According to embodiments, at operation 1107, the R-WTRU sends the first WTRU the new R-WTRU L2 ID for Link #1 in a Link Identifier Update Response message. According to embodiments, at operation 1108, the first WTRU may store the new R-WTRU L2 ID for Link #1. According to embodiments, at operation 1109, the first WTRU may send the R-WTRU and Link Identifier Update ACK message to acknowledge reception of the new R-WTRU L2 ID. According to embodiments, a R-WTRU may send the second WTRU a Link Identifier Update ACK message to acknowledge reception of the new UE2 L2 ID. According to embodiments, at operation 1110, the WTRUs may start using the new IDs across Link #1 and Link #2. According to embodiments, the first WTRU may keep (e.g., implicitly) old IDs for as long as there are ongoing communications using those IDs, for example, instead of (e.g., as an alternative to) using acknowledgment messages (e.g., operation 1109). According to embodiments, WTRUs may keep the old IDs for a (e.g., certain, agreed, configured, etc.) time limit (e.g., a UTC time) after communications start using the new IDs, for example, to account for potential frames using old IDs that may still be in transit (e.g., is retransmitted).

Figure 12:
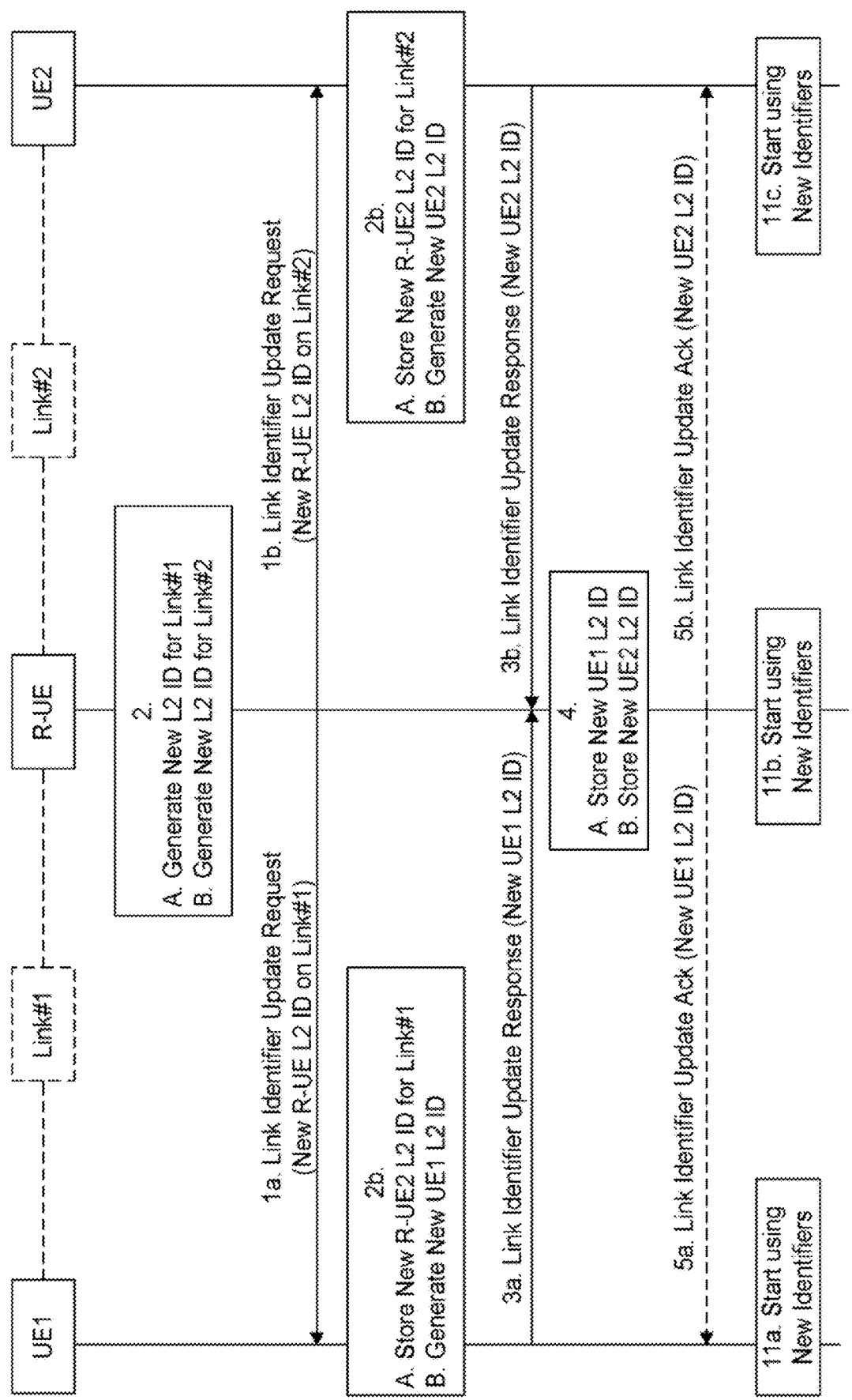
FIG. 12 is a diagram illustrating an enhanced Link Identifier Update procedure using a non-transparent R-WTRU, according to embodiments.

FIG. 12 is a diagram illustrating an enhanced Link Identifier Update procedure using a non-transparent R-WTRU, according to embodiments.

According to embodiments, referring to FIG. 12, there may be a case where a R-WTRU initiates a Link Identifier Update procedure. According to embodiments, for example, as a difference compared to FIG. 8, as shown in FIG. 12, a R-WTRU may initiate simultaneous (e.g., two or more) procedures over multiple links (e.g., Link #1 and Link #2, respectively). According to embodiments, a R-WTRU may synchronize usage of new IDs across both Link #1 and Link #2, for example, by sending the acknowledgment messages (see operation 5 in FIG. 12) on the condition of receiving Link Identifier Update Response messages from both a first WTRU (e.g., UE1) and a second WTRU (e.g., UE2).

Service Oriented Discovery and Communication Using a Transparent WTRU to WTRU Relay According to embodiments, a R-WTRU may receive messages from a SP-WTRU while the SU-WTRU is too far away and, for example, the SU-WTRU doesn't receive those messages. According to embodiments, in such a case the R-WTRU may retransmit such messages, for example, so that they may be received by the SU-WTRU. According to embodiments, such may be repeated in the other direction, that is, from the SP-WTRU to the SU-WTRU. According to embodiments, the R-WTRU may update any of source or destination fields/values (e.g., source/destination L2 IDs) and may forward the information of the updated fields/values. According to embodiments, the R-WTRU may not "consume" the messages, or in other words, the R-WTRU may not (e.g., cannot) look at the received messages' content, doesn't verify the integrity and/or decrypt the received messages, and doesn't sign and/or encrypt messages that it forwards. According to embodiments, a security association may be established end-to-end, for example, between a SP-WTRU and a SU-WTRU.

Control Plane and User Plane Stacks

Figure 13:
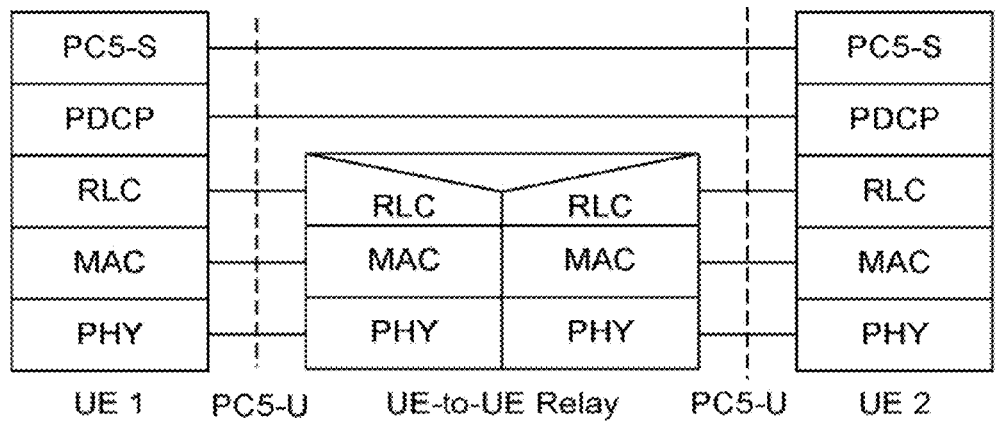
FIG. 13 is a diagram illustrating a control plane stack supporting a transparent R-WTRU, according to embodiments.

FIG. 13 is a diagram illustrating a control plane stack supporting a transparent R-WTRU, according to embodiments.

According to embodiments, (e.g. in contrast to a non-transparent relay/R-WTRU) a transparent R-WTRU may use a self-generated own (e.g., eponymous) L2 ID inserted as a source L2 ID in the already formed L2 frames relayed between WTRUs (e.g., WTRU1 and WTRU2). According to embodiments, L2 frames may be forwarded based on mapped WTRU L2 IDs (e.g., WTRU1 L2 ID, WTRU2 L2 ID), for example, similar to a non-transparent relay. According to embodiments, in the case of a transparent R-WTRU, security may be established end to end between WTRUs (e.g., WTRU1 and WTRU2), for example, as shown in FIG. 13 with the PDCP layer terminating in WTRU1 and WTRU2 and not in the R-WTRU. According to embodiments, (e.g. as a result of the PDCP layer terminations) a R-WTRU may not process any security of an incoming signaling packet (e.g., from WTRU1 destined to WTRU2) before forwarding it in a L2 frame using its own L2 ID as source ID and the target WTRU's L2 ID as per the relay mapping information (e.g., WTRU2's L2 ID).

Figure 14:
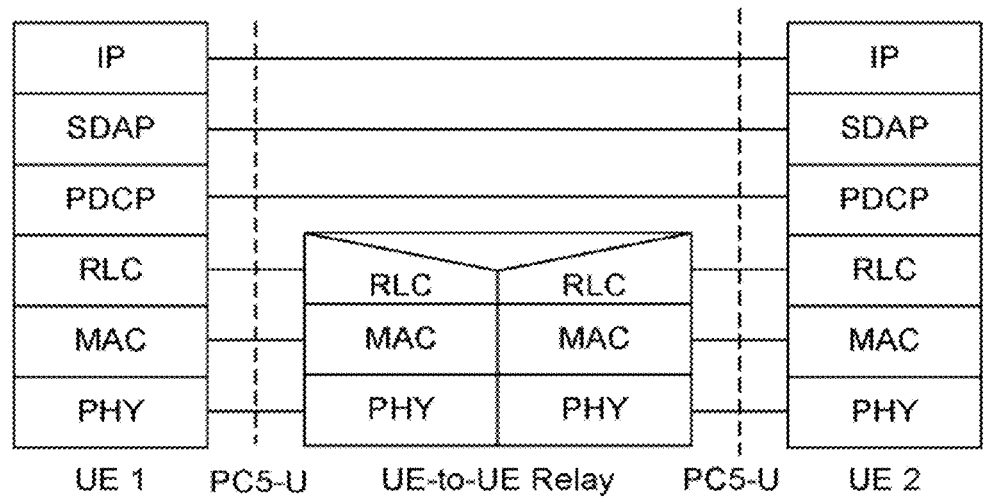
FIG. 14 is a diagram illustrating a user plane stack supporting a transparent R-WTRU, according to embodiments.

FIG. 14 is a diagram illustrating a user plane stack supporting a transparent R-WTRU, according to embodiments. According to embodiments, referring to the user plane stack, as for a control plane, a R-WTRU does not process and/or apply any security on incoming/outgoing relayed IP packets.

Link Establishment

Peer Discovery and Unicast Link Communication Establishment

According to embodiments, in a case of a service-oriented method, a SP-WTRU may broadcast a service (e.g., that it supports) in a unicast link establishment request message (e.g., a DCR message) and a SU-WTRU, which is interested in the service, may respond (e.g., reply to this message) by triggering a security context establishment and sending a unicast link accept message (e.g., a DCA message). According to embodiments, a user-oriented method with the SU-WTRU's application ID being specified in a broadcast message, for example, instead of a service ID, may (e.g., also, as well, etc.) be used. According to embodiments, a SP-WTRU may broadcast a service (e.g., that it supports) in a discovery message (e.g. any of an announcement message or discovery response), and a SU-WTRU, which is interested in the service, may respond by sending a unicast link establishment request message (e.g., a DCR message). According to embodiments, a service-oriented method is used to describe any of SP-WTRU, SU-WTRU and R-WTRU behavior, and such features may (e.g., also) be applied to any of a user-oriented method or discovery method.

According to embodiments, (e.g., as compared to, for example, conventional, service-oriented methods) in a case of any of user-oriented and discovery methods (e.g., as described according to embodiments above), a R-WTRU may be used between a SP-WTRU and a SU-WTRU. According to embodiments, both the SP-WTRU and the SU-WTRU may not (e.g., doesn't) know their peer WTRU's L2 ID. According to embodiments, WTRUs send messages to the R-WTRU and receive messages from the R-WTRU. According to embodiments, a security association and a unicast link is (e.g., only) established between the SP-WTRU and the SU-WTRU, and in such a case, a R-WTRU may (e.g., only, just) forward the messages.

According to embodiments, a SP-WTRU may announce (e.g., its) supported services and/or may discover a SU-WTRU using a (e.g., normal) discovery mechanism, for example, using a user-oriented or a service-oriented method as described above. According to embodiments, a SP-WTRU may detects that communication is going through a R-WTRU by getting a relay identifier (e.g., a RID, which may serve as a relay indication, a RIND) on received messages. According to embodiments, SP-WTRU establishes a secured unicast link with a SU-WTRU via the R-WTRU. According to embodiments, a SP-WTRU (e.g., additionally) establishes a secured unicast link with the R-WTRU for link management (e.g., for any of link identifier update, modification, release, etc.).

According to embodiments, a R-WTRU may assign to itself two R-L2 IDs when a unicast link is established between peer WTRUs and the R-WTRU may act as a relay for this link. According to embodiments, a first R-L2 ID may be used when forwarding a message from a first WTRU to a second WTRU. According to embodiments, a second R-L2 ID may be used when forwarding a message to the first WTRU from a second WTRU. According to embodiments, the R-WTRU may maintain a mapping table, for example, containing the mapping of peer WTRUs L2 IDs (e.g. any of a SP-L2 ID and a SU-L2 ID) and the corresponding (e.g., two) R-L2 IDs that have been self-assigned. According to embodiments, for example, when receiving a message, a R-WTRU may use the L2 ID (e.g., its R-L2 ID) specified in the destination field. According to embodiments, a R-WTRU may (e.g., additionally) use the sending WTRU L2 ID, for example, to find a related mapping entry in its mapping table. According to embodiments, a R-WTRU may (e.g., then) update the source and destination fields of the message with its own R-L2 ID and the peer WTRU's L2 ID, for example, before forwarding the message. According to embodiments, a R-WTRU may (e.g., also) add its RID to the DCR message and/or discovery message that it forwards. According to embodiments, a R-WTRU may (e.g., also) reply to the broadcast DCR message to establish a unicast management link with the SP-WTRU. According to embodiments, a R-WTRU may use another self-assigned R-L2 ID for this management link and may specify its relay identifier (RID).

According to embodiments, a SU-WTRU may discover a SP-WTRU via a R-WTRU. According to embodiments, a conventional (e.g., normal) discovery mechanism is used, for example, using any of a user-oriented method, a service-oriented method, and a discovery procedure. According to embodiments, a SU-WTRU may receive any of a broadcast DCR message with a RIND or a discovery message with a RIND, such RIND may be a RID. According to embodiments, a SU-WTRU may establish a secured unicast link with a SP-WTRU, via the R-WTRU. According to embodiments, link management may be done via any of communication with the SP-WTRU or via a secured unicast link with the R-WTRU.

Figure 15:
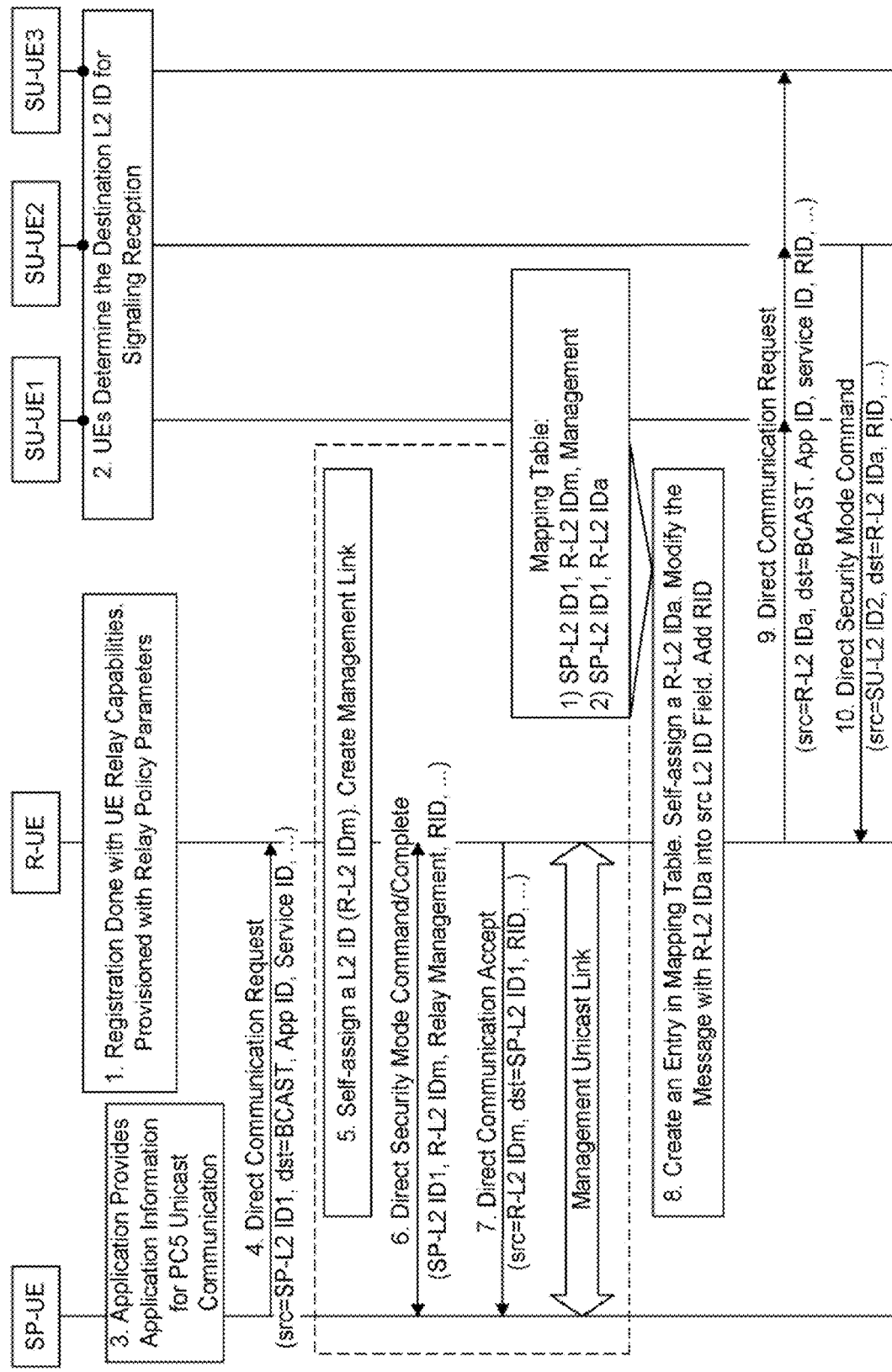
FIG. 15 is a diagram illustrating discovery and unicast link establishment, according to embodiments.
Figure 15:
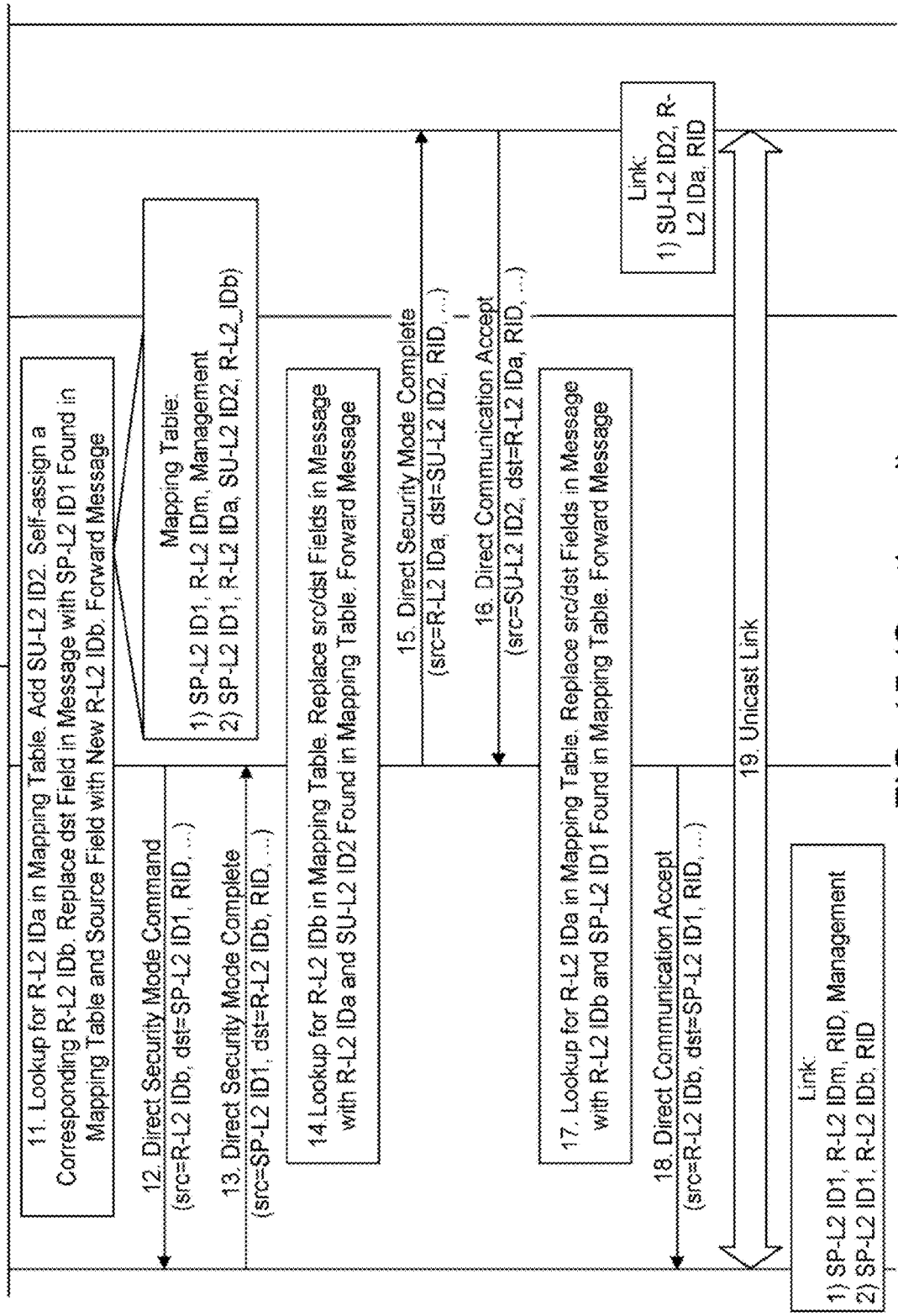

FIG. 15 is a diagram illustrating discovery and unicast link establishment, according to embodiments.

According to embodiments, referring to FIG. 15, service-oriented discovery may be performed and a unicast link may be established between a SP-WTRU and a SU-WTRU, via a R-WTRU. According to embodiments, referring to FIG. 15, a SU-WTRU may reply to a received DCR by sending a Direct Security Mode (DSM) Command message (for example, as described above).

According to embodiments, at operation 1501, a R-WTRU may register with the network and may specifies its R-WTRU capabilities. According to embodiments, a R-WTRU may be provisioned with relay policy parameters from the network. According to embodiments, at operation 1502, a SU-WTRU may determine the destination L2 ID (e.g., a broadcast L2 ID) associated with any of an application and a service they are interested in receiving and may configure a lower layer to receive such messages. According to embodiments, at operation 1503, an application layer may provide information to a ProSe layer for PC5 unicast communication (e.g. any of a broadcast L2 ID, a service ID, a WTRU's application ID, etc.). According to embodiments, at operation 1504, a ProSe layer may trigger a peer WTRU discovery mechanism, for example, by sending a broadcast DCR message. According to embodiments, the broadcast DCR message may include any of a SP-L2 ID as source, a broadcast L2 ID as a destination, and other parameters related to the application and service offered. According to embodiments, operations 1505-1507 may be optionally performed. For example, according to embodiments, in a case where a secured link between a SP-WTRU and a R-WTRU (e.g., already) exists for SP-L2 ID1, these operations 1505-1507 may be skipped. More details about the link management usage are described herein.

According to embodiments, at operation 1505, a R-WTRU may receive a broadcast DCR message and may verify if it may (e.g., if it is configured to) relay an (e.g., this) application and/or service. According to embodiments, a R-WTRU may compare (e.g., look for a match for) an announced service with any of its provisioned relay policy or relay parameters. According to embodiments, in a case of a match, the R-WTRU may self-assign a R-L2 ID (e.g. R-L2 IDa, wherein a IDa refers to a self-assigned ID) to be used for a management link with the SP-WTRU. According to embodiments, the R-WTRU may reply to the received DCR message, for example, to establish a secured unicast link for the management of other unicast links related to the broadcast DCR message from SP-WTRU. According to embodiments, such other unicast links may be setup between the SP-WTRU and SU-WTRUs and that may be relayed by the R-WTRU. According to embodiments, at operation 1506, a R-WTRU and a SP-WTRU may establish a security context. According to embodiments, a R-WTRU may specify that a (e.g., this) link is established for link management. According to embodiments, a R-WTRU may (e.g., also) specify its unique relay ID (e.g., a RID) that uniquely identifies it and serves as a Relay WTRU indication (e.g. a RIND). According to embodiments, (e.g., all) R-WTRUs may (e.g., shall, must, should, etc.) be provisioned with a unique identifier (e.g., a RID). According to embodiment, a R-WTRU may include its RID in a confidentiality protected message (e.g., DCA) to preserve R-WTRU privacy. According to embodiments, at operation 1507, for example, in a case where a security context is established, the unicast link establishment may be completed.

According to embodiments, at operation 1508, a R-WTRU may (e.g., proceed to) forward a broadcast DCR message received from a SP-WTRU. According to embodiments, a R-WTRU may self-assigns a R-L2 ID (e.g. a R-L2 IDa) to be used as a replacement of SP-L2 ID (e.g. SP-L2 ID1) when forwarding messages from the SP-WTRU to the SU-WTRUs. According to embodiments, these (e.g., tow) IDs may be saved in a local mapping table, and for example, the R-WTRU may override the source field with its R-L2 IDa and may add its RID. According to embodiments, a R-WTRU may (e.g., have a capability to) detect a direction (e.g., from which) the message has been received. According to embodiments, in such a case, the R-WTRU may keep the receive direction in the mapping table with the SP-L2 ID.

According to embodiments, at operation 1509, a R-WTRU may send a modified DCR message with its R-L2 IDa as the source, toward other directions (e.g., not toward the initial sender/SP-WTRU), if another direction is available. According to embodiments, any of SU-WTRUs (e.g., see FIG. 15, SU-UE1, SU-UE2 and SU-UE3) may receive the broadcast message. According to embodiments, at operation 1510, a SU-WTRU2 may be interested in such service (e.g., the service announced in the DCR) and may reply to the R-WTRU, for example, by transmitting a DSM Command message to establish a security context with the SP-UE. According to embodiments, the SU-WTRU2 may keep track of the R-L2 IDa and RID. According to embodiments, the RID may be specified with the DSM Command message, for example, so that the SP-WTRU knows, when receiving this message, that the link is going through this R-WTRU.

According to embodiments, at operation 1511, the R-WTRU may receive the DSM Command message and may use the R-L2 IDa specified in the destination field to find the related entry in its mapping table. According to embodiments, in a case where a mapping entry doesn't have a (e.g., any) SU-WTRU associated therewith, the R-WTRU may update the mapping entry with the L2 ID (e.g., a SU-L2 ID2) specified in the source field and According to embodiments, the R-WTRU may (e.g., additionally) keep track of the direction (e.g., from where) the message was received, for example, if this information is available. According to embodiments, the R-WTRU may self-assigns a new R-UE L2 ID2b to be used when forwarding messages from SU-L2 ID2 to SP-L2 ID1. According to embodiments, the new R-L2 IDb may (e.g., also) be saved in the mapping entry. According to embodiments, a R-WTRU may set the source field or the adaptation layer field of the message to R-L2 IDb, and the R-WTRU may set the destination field to SP-L2 ID1 retrieved from the mapping entry.

According to embodiments, a R-WTRU may not (e.g., doesn't) look at or modify the content of the message, and, for example, may only modify source and destination fields of the message. According to embodiments, for example, upon reception of the DSM Command message, the R-WTRU may create a new entry in the table using the same R-L2 ID as specified in the destination field, for example, if the entry is already associated with another SU-WTRU, e.g. another SU-WTRU has already replied to the broadcast message and has already established a unicast link. According to embodiments, in a case where multiple entries in the mapping table associated to the R-L2 ID are found, the R-WTRU may look up the SU-L2 ID in addition to the R-L2 ID, as discussed below. According to embodiments, at operation 1512, the R-WTRU may send the modified message towards the SP-WTRU, for example, in any of the direction associated to this L2 ID or the direction other than the direction from where it has been received.

According to embodiments, at operation 1513, a SP-WTRU may receive the DSM Command message, may keep track of the R-L2 IDb and RID, and may reply with a DSM Complete message. According to embodiments, the RID may be specified on the DSM Complete message, which may be sent to the R-WTRU. According to embodiments, at operation 1514, a R-WTRU may receive the DSM command message and may find a corresponding entry in its mapping table (e.g. corresponding to destination field R-L2 IDb). According to embodiments, from this corresponding entry, a R-WTRU may obtain the associated SU-L2 ID2 and direction, if available. According to embodiments, the R-WTRU may (e.g., then) modify the message to specify the SU-L2 ID2 as a destination (e.g., address/identifier) and its R-L2 ID1 as a source (e.g., address/identifier). According to embodiments, at operation 1515, a R-WTRU may (e.g., then) forward the DSM command message toward the SU-WTRU2, that is, in the direction of any of the SU-WTRU2 or other than the received direction.

According to embodiments, at operation 1516, the SU-WTRU2 may (e.g., then) complete the unicast link establishment, for example, by sending a DCA message toward the R-WTRU. According to embodiments, the RID may be specified (e.g., included) in a DCA message. According to embodiments, at operation 1517, a R-WTRU may receive the message and may (e.g., again) do a lookup in its mapping table to find the entry corresponding to the destination field. According to embodiments, in a case where the entry is found, the R-WTRU may modify the message, for example, by setting any of a source field or an adaptation layer field of the message to the R-L2 IDb based on (e.g., according to, as specified/found in, etc.) the mapping entry and by setting the destination field to the SP-L2 ID1 based on the mapping entry. According to embodiments, at operation 1518, a R-WTRU may send the modified message to toward the a SP-WTRU, for example, in any of the direction associated to this L2 ID or in the direction other than the direction from where the modified message may be received. According to embodiments, at operation 1519, a unicast link may be established between the SP-WTRU and the SU-WTRU2, via the R-WTRU. According to embodiments, the link is secured, for example, such that a security context has been created between the WTRUs. According to embodiments, encrypted and/or integrity protected messages (e.g., data or PC5-S messages) may be exchanged between the SP-WTRU and the SU-WTRU2. According to embodiments, the R-WTRU may be not involved in this security association, and, for example, thus it cannot read and/or modify the secured portion of the message (e.g., which excludes the source/destination fields).

Figure 16:
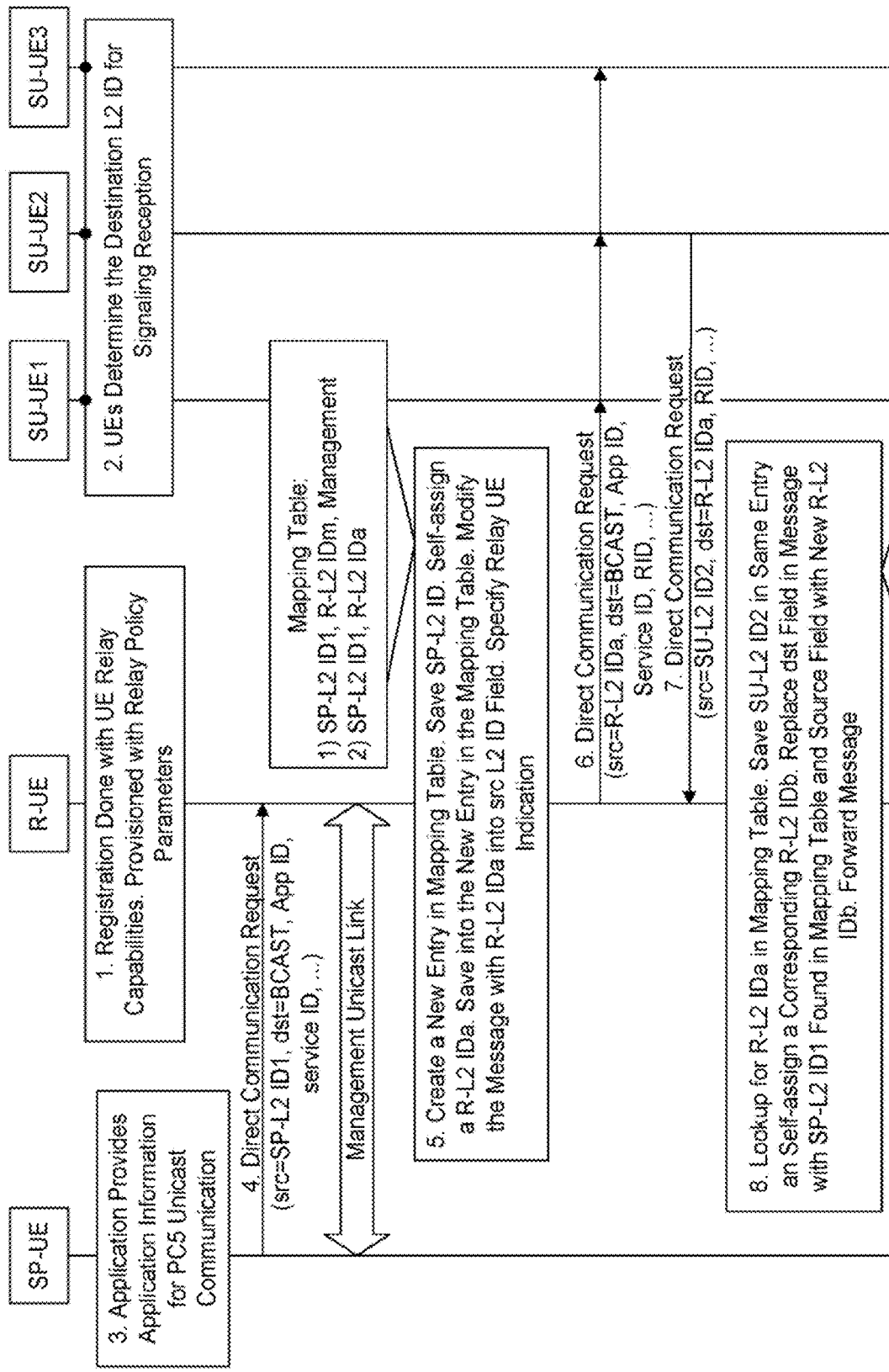
FIG. 16 is a diagram illustrating discovery and unicast link establishment, according to embodiments.
Figure 16:
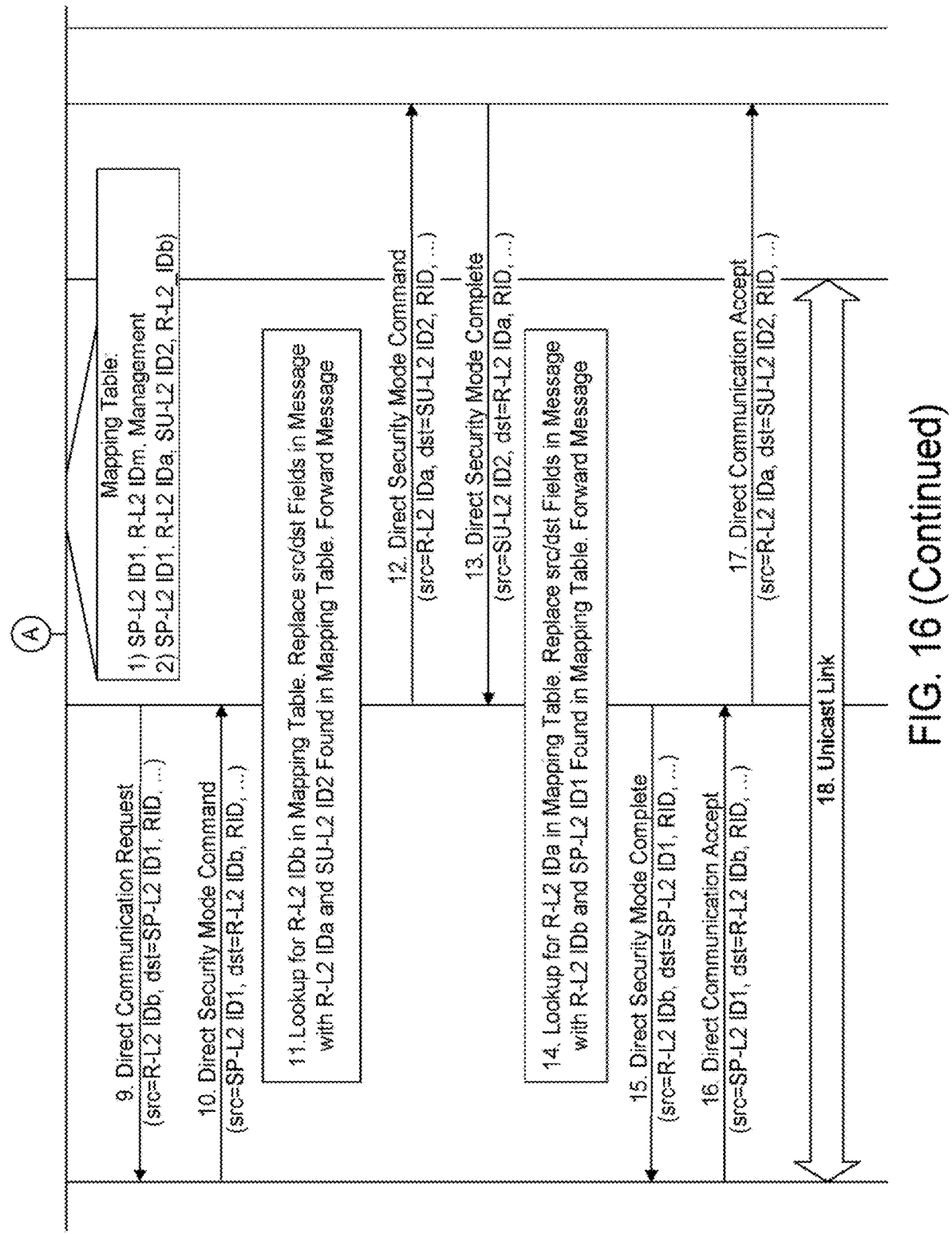

FIG. 16 is a diagram illustrating discovery and unicast link establishment, according to embodiments.

Referring to FIG. 16, a SU-WTRU may trigger a unicast link establishment, for example, in response to discovery. According to embodiments, a SP-WTRU may broadcast a (e.g., supported) service in a unicast link establishment request message (e.g., a DCR message or discovery message). Further, according to embodiments, a SU-WTRU, which is interested in the service, replies to the broadcast DCR or discovery message by triggering a unicast link establishment with the SP-WTRU (e.g., by sending a DCR message). According to embodiments, initiation of a security context establishment (e.g., DSM command message) and sending of a unicast link accept message (e.g., a DCA message) may be done by the SP-WTRU.

Referring to FIG. 16, according to embodiments, discovery and unicast link/communication establishment may be similar to (e.g., the same) as shown in FIG. 15, and may include the any of the following operations and modifications discussed with respect to operations shown in FIG. 16. According to embodiments, at operation 1607, a SU-WTRU may send a DCR message, for example, in response to the received broadcast DCR or discovery message. In such a case, according to embodiments, the SU-WTRU may send a DCR message to the broadcast R-L2 ID. According to embodiments, the R-WTRU looks into its mappings table, searching for the specified R-L2 ID and adds the received SU-L2 ID in the table entry, for example, in a manner similar to as may be done when a DSM Command message is received (e.g., operation 1507 of FIG. 14). According to embodiments, at operation 1609, a SP-WTRU may receive a DCR message and may reply at operation 1610 by sending a DSM Command message. According to embodiments, at operation 1613, a SU-WTRU sends (e.g., back) a DSM Complete message and the SP-WTRU may complete the unicast link establishment (e.g., at operation 1616) by sending a DCA message. According to embodiments, a R-WTRU may (e.g., just) forward the messages between the SP-WTRU and the SU-WTRU, at operations 1609, 1612, 1615, and 1617, for example, by replacing the source and destination and possibly adaptation layer fields with the appropriate values, based on the information saved in its mapping table.

Multiple SU-WTRUs Establishing a Unicast Link with a SP-WTRU

Figure 17:
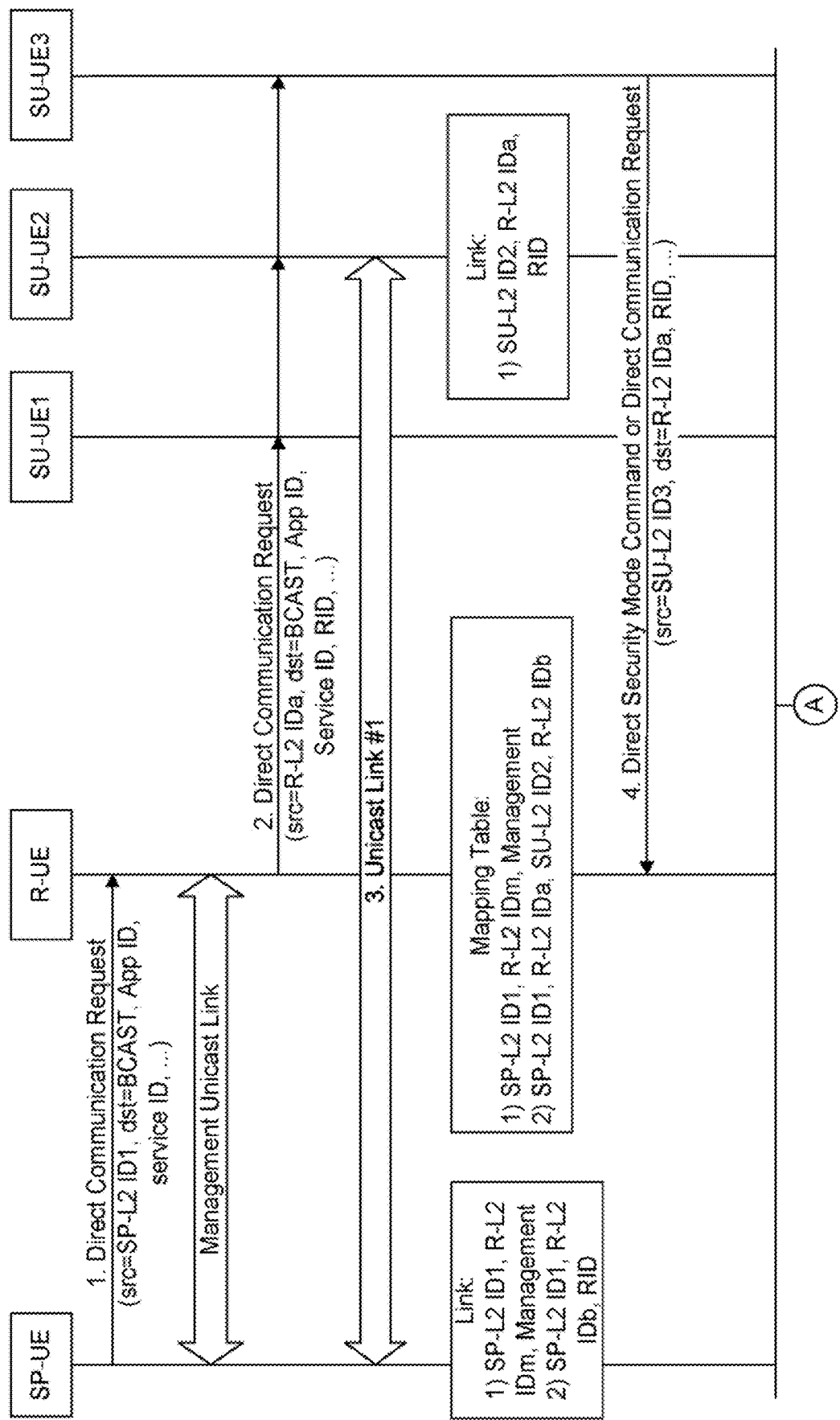
FIG. 17 is a diagram illustrating a second unicast link establishment, according to embodiments.
Figure 17:
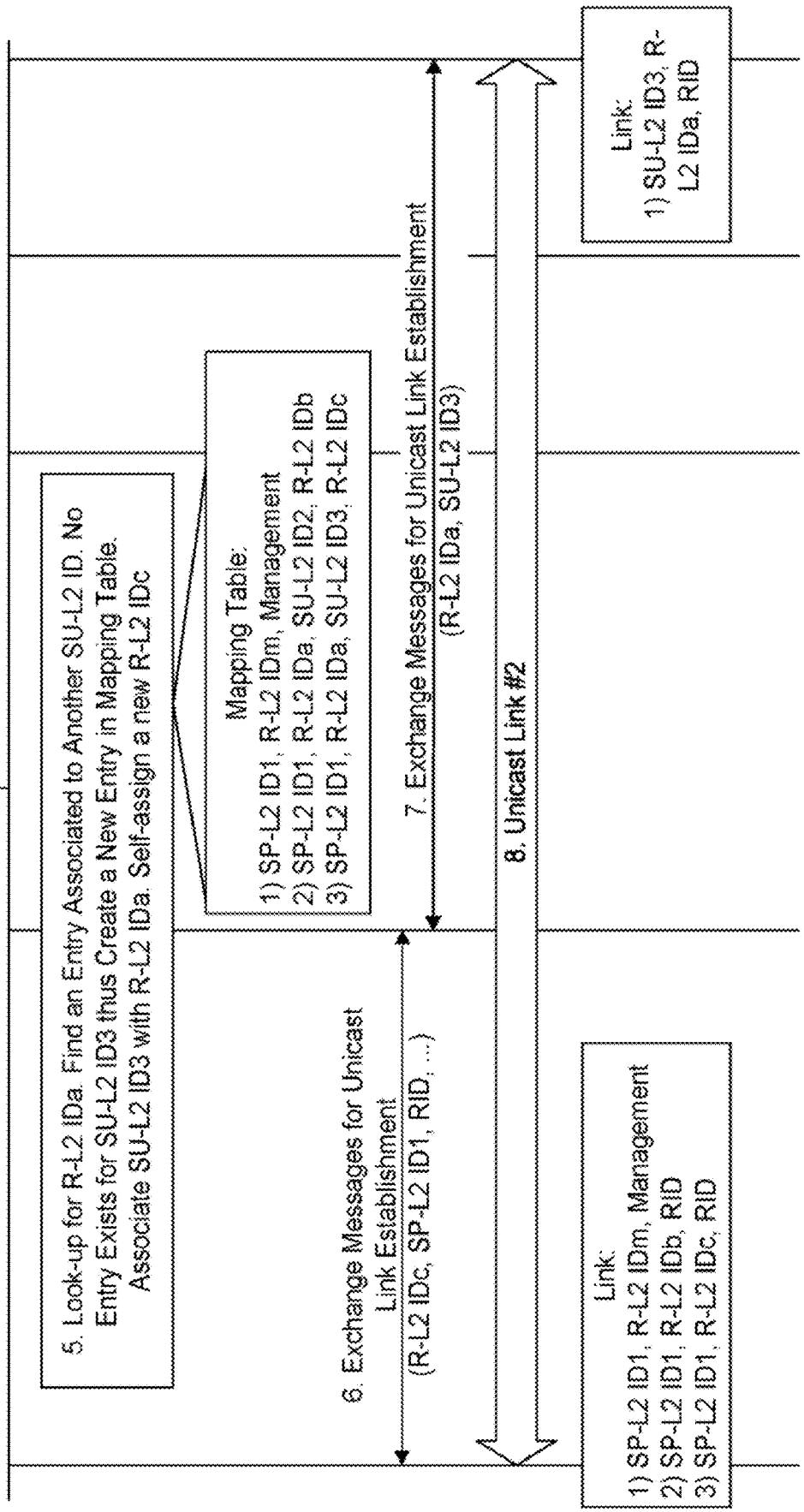

FIG. 17 is a diagram illustrating a second unicast link establishment, according to embodiments.

Referring to FIG. 17, a second SU-WTRU may be interested in a service broadcasted by the SP-WTRU. According to embodiments, the R-WTRU may create a new mapping in its table and may assign itself a new R-L2 ID, for example, to forward the messages from a third SU-WTRU3 to a SP-WTRU. According to embodiments, at operation 1701, a SP-WTRU may advertise a service (e.g., any number of supported services) by triggering a peer WTRU discovery mechanism, for example, by sending a broadcast DCR or discovery message. According to embodiments, the broadcast DCR or discovery message may include any of a SP-L2 ID1 as source, a broadcast L2 ID as destination, and other parameters related to any of the application and service offered.

According to embodiments, at operation 1702, a R-WTRU may receive the broadcast message and may verify if the R-WTRU is configured to relay any of an application or service advertised by the message. According to embodiments, in a case where any of the application or the service matches (e.g., the R-WTRU is configured to relay any of the application or the service), the R-WTRU may proceed with forwarding the message. According to embodiments, the R-WTRU may assign itself a R-L2 ID (e.g. a R-L2 IDa), for example, to be used as a replacement of a SP-L2 ID (e.g. SP-L2 ID1) when forwarding messages from the SP-WTRU. According to embodiments, these (e.g., two) IDs may be saved in a local mapping table. According to embodiments, the R-WTRU may override the source field with its R-L2 IDa and may add a RID. According to embodiments, a R-WTRU may establish a management link with the SP-WTRU, for example, if such a link doesn't exist already (e.g., as discussed above).

According to embodiments, at operation 1703, other messages may be exchanged (e.g., as illustrated in FIG. 15) and a unicast link may be established between a SP-WTRU and a SU-WTRU2, via the R-WTRU. According to embodiments, a SP-WTRU and a R-WTRU may interact together, for example, using a SP-L2 ID1 and a R-L2 IDb, respectively. According to embodiments, a SU-WTRU2 and a R-WTRU may interact together, for example, using a SU-L2 ID2 and a R-L2 IDa, respectively. According to embodiments, a R-WTRU may keep a mapping table, for example, to replace the SP-L2 ID1 with the R-L2 IDa and replace the SU-L2 ID2 with the R-L2 IDb. According to embodiments, at operation 1704, a SU-WTRU3 may (e.g., also) be interested in (e.g., by) a service offered by the SP-WTRU (via the R-WTRU), and the SU-WTRU3 may send any of a DCR or a DSM Command message to the R-WTRU (e.g., to R-L2 IDa) using a SU-L2 ID3. According to embodiments, any of a DCR and a DSM command message may be sent as described herein.

According to embodiments, at operation 1705, a R-WTRU may look-up in (e.g., search, read, check, etc.) its mapping table for a R-L2 IDa. According to embodiments, in a case where an entry is found but the entry is used by the S-WTRU2 (e.g., indicates the SU-L2 ID2), the R-WTRU may create a new entry in the mapping table. According to embodiments, any of the R-L2 IDa and the SU-L2 ID3 may be saved in the mapping table. According to embodiments, a R-WTRU may know, for example, from the first entry that it has found with SU-WTRU2, that the SP-WTRU is identified with SP-L2 ID1. According to embodiments, such may be saved in the new entry as well. According to embodiments, R-WTRU may assign itself a new L2 ID, such as R-L2 IDc, that may be (e.g., also) saved in the mapping entry and may be used as a replacement of a SU-L2 ID3, for example, when forwarding messages toward the SP-WTRU3. According to embodiments, at operation 1706, messages may be exchanged between the R-WTRU and the SP-WTRU using R-L2 IDc and SP-L2 ID1, respectively.

According to embodiments, messages may be exchanged according to method used as highlighted at operation 1704, and for example, it may be any of a Announcement, Discovery Request, Discovery Response, Authentication Request, Authentication Response, DSM Command, a DSM Complete, a DCR, and a DCA. According to embodiments, at operation 1707, messages may be exchanged between the R-WTRU and the SU-WTRU3 respectively using a R-L2 IDa and a SU-L2 ID3. According to embodiments, messages may be exchanged in a manner similar to as stated regarding operation 1706. According to embodiments, at operation 1708, a second unicast link may be established from the SP-WTRU side, for example, this time with the SU-WTRU3, via the R-WTRU. According to embodiments, the SP-WTRU and the R-WTRU may interact together using any of a SP-L2 ID1 and a R-L2 IDc. According to embodiments, the SU-WTRU2 and the R-WTRU may interact together using a SU-L2 ID3 and R-L2 IDa.

Link Management

According to embodiments, link management may (e.g., needs to, must, etc.) be supported when a R-WTRU is used between two peer WTRUs. According to embodiments, link management may include (e.g., functionalities, functions, operations, features, etc.) any of: keepalive, link identifier update, link release, link modification, and new services, new QoS, etc. According to embodiments, link management may (e.g., needs to) be done between (e.g., the two) ends (e.g., end-points, termination points, etc.) of the unicast link, e.g. between the SP-WTRU and the SU-WTRU. According to embodiments, the unicast link security association may be (e.g., only) between the SP-WTRU and the SU-WTRU, and, in such a case, the L2 IDs used for sending/receiving messages are between the R-WTRU and the SP-WTRU/SU-WTRU. According to embodiments, for example as in the case above, when updating the L2 ID on the SP-UE, a R-WTRU may (e.g., needs to, should, etc.) be informed of the updated L2 IDs.

According to embodiments, in a case of using a unicast link going through a R-WTRU (e.g., using a transparent R-WTRU method as discussed above), the R-WTRU may be (e.g., is) not aware of which messages are exchanged between (e.g., the two) WTRUs (e.g. Link Identifier Update) because the messages may be encrypted; and (e.g., only) the peer WTRUs may decrypt the message. According to embodiments, the R-WTRU (e.g., only) has access to the unprotected portion of the message, such as, for example, any of source L2 IDs and destination L2 IDs. However, according to embodiments, the SP-WTRU and the SU-WTRU may not be (e.g., are not) aware of the L2 ID of their peer WTRU, and in such a case, these WTRUs may send messages using the R-WTRU's L2 ID.

According to embodiments, to enable the management of links going through a R-WTRU, a (e.g., management) unicast link may be established between a WTRU (e.g., a SP-WTRU and/or a SU-WTRU) and the R-WTRU. According to embodiments, this unicast link may be a management link used to manage other links, for example, links that are going through the R-WTRU and that are associated to the same RID as the management link. According to embodiments, the management link may be secured (e.g. integrity, replay, and confidentiality protected) between the SP-WTRU and the R-WTRU. According to embodiments, existing messages for any of a link identifier update, a link modification, and a link release may be updated, for example, to be able to notify the R-WTRU about any change on a relayed unicast link. According to embodiments, a management link may be established between the SP-WTRU and R-WTRU and between the R-WTRU and the SU-WTRUs, for example, for authentication purposes. That is, according to embodiments, in a case of establishing a management link, an authentication procedure is executed, permitting the SP-WTRU and the R-WTRU to authenticate each other, and such an authentication procedure (e.g., the same authentication procedure) applies to the management link between the R-WTRU and the SU-WTRUs. According to embodiments, the relayed unicast link (e.g., the link between the SP-WTRU and the SU-WTRU) remains as discussed (e.g., as defined) above. That is, the relayed unicast link may be between the (e.g., two) peer WTRUs with the R-WTRU (e.g., just) forwarding the messages without being involved in any of encryption or decryption, etc.

According to embodiments, there may be at least two methods to support link management, including any of: 1) using a single management link to manage links between a SP-WTRU and SU-WTRUs; and 2) multiple management links, for example, on every WTRU (e.g., every SP-WTRU and SU-WTRUs). According to embodiments, management links may be released, for example, in a case where the procedure for which they were needed is completed. According to embodiments, management links may be kept. According to embodiments, in a case where the management links are kept, then they may be considered as (e.g., are just like) any other link, such that their L2 IDs may (e.g., need to) be updated periodically, etc. According to embodiments, how the management link may be used based on these two methods are discussed herein, for example, using a Link Identifier Update procedure as an example.

According to embodiments, a single management link may be established between the SP-WTRU (e.g., which has broadcasted a DRC) and a R-WTRU, for example, without having a management link established between the R-WTRU and SU-WTRU(s). According to embodiments, in such a case, the SU-WTRU(s) may communicate with the SP-WTRU for link management, and the SP-WTRU may communicate the link information to the R-WTRU, via the management link, and communicates, back to the SU-WTRU, the information received from the R-WTRU. According to embodiments, there may be any number of (e.g., a plurality, multiple) management links, including, for example, a first management link between the SP-WTRU and a R-WTRU, and a second management link between the R-WTRU and the SU-WTRU. According to embodiments, in such a case, the R-WTRU may have a first management link with the SP-WTRU and a second management link with the SU-WTRU (e.g., per SU-L2 ID), for example, as saved in its local mapping table.

According to embodiments, a L2 Link Identifier may be updated, for example, via a management Link. According to embodiments, a SP-WTRU and a SU-WTRU may have a unicast link established, and their identifiers (e.g., L2 ID, security information, etc.) may (e.g., must, needs to, should, etc.) be periodically be changed for privacy reasons. According to embodiments, a procedure to support a L2 ID update described above. According to embodiments, other identifiers (e.g., application layer ID, IP address/prefix, etc.) may (e.g., also) be changed during such a procedure. According to embodiments, in a case where the R-WTRU is involved between the two WTRUs, and using its L2 IDs for relaying purposes, the R-WTRU may (e.g., must, should, needs to, etc.) (e.g., also) update its L2 IDs, for example, the same way as any of a SU-WTRU and a SP-WTRU. That is, according to embodiments, the R-WTRU may (e.g., must also) periodically change the L2 IDs it is using, and, for example, which are associated to a unicast link. According to embodiments, the R-WTRU may periodically change (e.g., update) the L2 IDs in a case where (e.g., upon, whenever) any of peer WTRUs change their L2 ID.

According to embodiments, for example, to make sure a malicious WTRU cannot associate old L2 IDs with new L2 IDs, all WTRUs involved in a unicast link may (e.g., must, shall, need to, etc.) change their identifiers (e.g., L2 IDs, security info, and (e.g., optionally) an application layer ID and a IP address/prefix), for example, at the same time. According to embodiments, in a case where a R-WTRU substituting its own L2 IDs when forwarding messages, the R-WTRU may (e.g., should, must, etc., also) change its L2 IDs. In such a case, the R-WTRU may not (e.g., does not need to) change other identifiers during such a procedure, for example, because the other identifiers are only known by the two peer WTRUs. For example, in a case where the security is established end-to-end (e.g., between the two peer WTRUs), a R-WTRU may not (e.g., does not need to) update any security info.

According to embodiments, as discussed herein, a management link may be used to execute the Link Identifier Update procedure. According to embodiments, the existing Link Identifier Update messages are modified to additionally include any of: 1) other link information; 2) associated current L2 IDs; and 3) associated new L2 IDs. Further, according to embodiments, information about multiple links may be specified. According to embodiments, as discussed herein, two solutions (e.g., regarding management links) are proposed: 1) a single management link to a R-WTRU and 2) multiple management links to the R-WTRU. According to embodiments, in a case where a Link Identifier Update procedure is (e.g., only, solely, etc.) run on one WTRU (e.g., a SP-WTRU) without the other WTRUs (e.g., any of a R-WTRU and a SU-WTRU) having to change their L2 IDs. According to embodiments, in such a case, any of the solutions described above using a single management or multiple management links may be used.

According to embodiments, there may be a case of a single management link. According to embodiments, for example, as discussed above, a SP-WTRU may have a management link established with the R-WTRU for the management of links relayed by the (e.g., specific) R-WTRU. For example, a SP-WTRU may have broadcasted a specific service that it supports (e.g., via a DCR message using SP-L2 IDx) and multiple SU-WTRUs interested in the service may have established unicast links with the SP-WTRU, via the R-WTRU. In such a case, the unicast links may be associated to SP-L2 IDx, and the SP-WTRU may be in charge of updating the R-WTRU with its peer WTRUs L2 ID updates, for example, in addition to its own SP-L2 ID update. According to embodiments, the SU-WTRUs may share their L2-IDs (e.g., current and updated values) with the SP-WTRU, for example, so that the SP-WTRU may inform the R-WTRU about these IDs. According to embodiments, the SP-WTRU may send back the updated R-L2 ID to the appropriate SU-WTRU.

Figure 18:
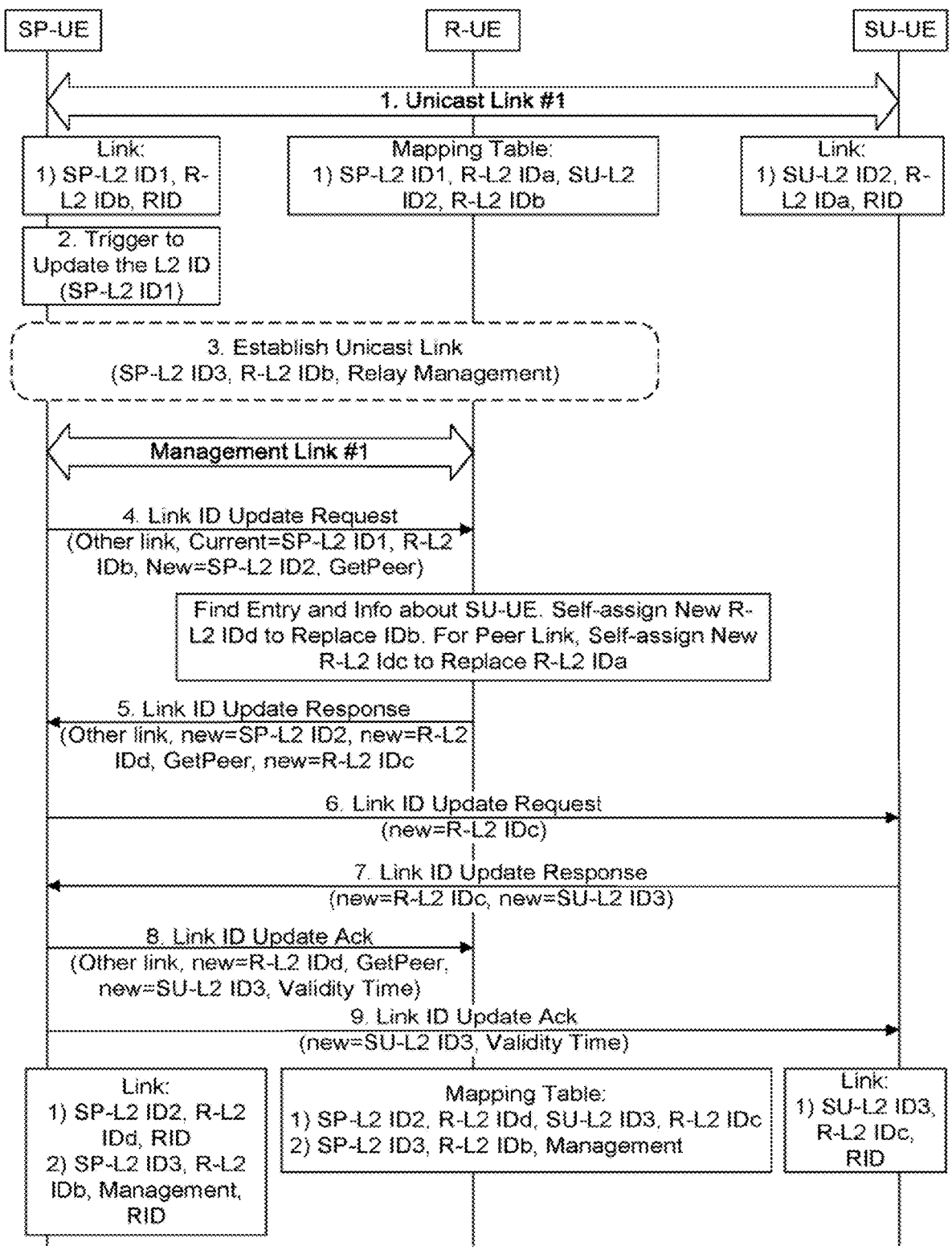
FIG. 18 is a diagram illustrating a SP-WTRU initiated Link Identifier Update Procedure on all WTRUs—Single Management Link, according to embodiments.

FIG. 18 is a diagram illustrating a SP-WTRU initiated Link Identifier Update Procedure on all WTRUs—Single Management Link, according to embodiments.

According to embodiments, at operation 1801, a unicast link may be established between the peer WTRUs via a R-WTRU. According to embodiments, the SP-WTRU may maintain a Link Table with any of its L2 ID (e.g., SP-L2 D1), the Relay L2 ID (e.g., R-L2 IDb), and an indication that this link is relayed by the R-WTRU (e.g. any of a RIND or a RID). According to embodiments, the SU-WTRU may also maintain a Link Table with any of its L2 ID (e.g., SU-L2 ID2), the Relay L2 ID (e.g., R-L2 IDa) and an indication that this link is relayed by the R-WTRU (e.g., RID, RIND). According to embodiments, the R-WTRU may maintain a Mapping Table containing any of the SP L2 ID (e.g., SP-L2 IDa) with the R-WTRU's associated Relay L2 ID (e.g., R-L2 IDa), and the SU-L2 ID (e.g., SU-L2 ID2) with its associated Relay L2 ID (e.g., R-L2 IDb).

According to embodiments, at operation 1802, a SP-WTRU may receive a trigger (e.g. a timer expiry), for example, to update its SP-L2 ID1, which may be associated to the unicast link established with SU-WTRU via the R-WTRU (e.g., R-L2 IDb). According to embodiments, at operation 1803, (e.g., which may be considered as an optional operation/procedure) the SP-WTRU may establish a secured unicast link with the R-WTRU, for example, for link management purposes, for example, in a case where such a link is not already established. According to embodiments, for this management link, the SP-WTRU may assign itself a new L2 ID (e.g., SP-L2 ID3) and may use the known Relay L2 ID (e.g., R-L2 IDb). According to embodiments, the management link may be established with the R-WTRU handling the link which needs to be updated, as identified by the RID.

According to embodiments, at operation 1804, the SP-WTRU may assign itself a new SP-L2 ID2 to replace SP-L2 ID1. According to embodiments, the SP-WTRU may sends a Link Identifier Update Request to the R-WTRU, for example, to inform the R-WTRU about the SP-WTRU's current and new L2 IDs and to request information from the R-WTRU about the associated unicast link (e.g., relayed link) with the SU-WTRU. According to embodiments, an indication for another link may be specified, for example, to indicate that a message includes information referring to a link other than the one which is transporting the message. According to embodiments, the SP-WTRU may specify the current L2 IDs identifying the other link (e.g., SP-L2 ID1 and R-L2 IDb) and new SP-L2 ID2. According to embodiments, a GetPeer indication may be specified to indicate that the information from the SU-WTRU (e.g., a R-L2 ID and S-L2 ID associated with this link) should be returned so that it may be sent to the SU-WTRU. According to embodiments, the SP-WTRU doesn't have this information since it's going through the R-WTRU.

According to embodiments, at operation 1805, a R-WTRU may receive the request and may find the entry in its mapping table. According to embodiments, the R-WTRU may get the information related to the other part of the link, such as, for example, a SU-L2 ID and related R-L2 ID. According to embodiments, the R_WTRU may (e.g., then) assign itself two new L2 IDs, a R-L2 IDd associated to the link with the SP-WTRU (e.g., the other link) and a R-L2 IDc associated to the link with SU-WTRU. According to embodiments, the R-WTRU may replies to SP-WTRU by sending a Link Identifier Update Response message with the other link indication followed by the new R-L2 IDd and, optionally, the new SP-L2 ID to acknowledge it, and a GetPeer indication followed by its new R-L2 IDc. According to embodiments, at operation 1806, the SP-WTRU may send the new R-L2 IDc information to the SU-WTRU using a Link Identifier Update Request. According to embodiments, other identifiers that may be updated may be sent using a Link Identifier Update Request. For example, the security information (e.g., MSB of $K_{NRP-sess}$ ID, and (optionally) the application layer ID and IP address/prefix).

According to embodiments, at operation 1807, the SU-WTRU may self-assign a new SU-L2 ID3, may save the new R-L2 IDc (and/or other updated identifiers) that it receives, and may send a Link Identifier Update Response message to the SP-UE including its new SU-L2 ID3. According to embodiments, the SU-WTRU may (e.g., also) include the information received on the Request message, for example, to ACK the Request message. According to embodiments, other identifiers that may be updated may (e.g., also) be sent using such a message. For example, the security information (e.g., LSB of $K_{NRP-sess}$ ID and (optionally) the application layer ID and IP address/prefix). According to embodiments, at operation 1808, the SP-WTRU receiving this message may save the received updated identifiers and may update the R-WTRU with the new SU-L2 ID3. According to embodiments, the update may be identified by using the "GetPeer" indication. According to embodiments, the SP-WTRU may (e.g., also) include the new R-L2 IDd received on the previous Response message (e.g., see operation 1805) to ACK it. According to embodiments, (e.g., additionally) a validity time may be specified, for example, to indicate an actual time of when to start using the new L2 IDs from the SP-WTRU, R-WTRU, and SU-WTRU. According to embodiments, such may ensure that all involved WTRUs start using the new L2 IDs at the same time. According to embodiments, at operation 1809, the SP-WTRU may (e.g., also) send a Link Identifier Update ACK message to the SP-WTRU, for example, providing the validity time.

According to embodiments, the other link (e.g., the link between the SP-WTRU and the SU-WTRU) may be identified using any of the current SP-L2 ID and the R-L2 ID. According to embodiments, once the entry is identified by the R-WTRU, it may return a reference number (e.g., a link number) to be used on all other related messages. According to embodiments, an alternative solution may be to switch the sequence of events, such that the SP-WTRU may first query its peer SU-WTRU to obtain its new L2 ID and then inform the R-WTRU of the new SU-L2 ID and its new SP-L2 ID. In such a case, the R-WTRU may (e.g., then) provide its new R-L2 IDs (e.g., for each side of the relay). According to embodiments, the SP-WTRU may (e.g., then) send the related R-L2 ID to the SU-WTRU.

According to embodiments, a SU-WTRU may initiate a Link Identifier Update procedure on all WTRUs. According to embodiments, in a case where a Link Identifier Update procedure is initiated by the SU-WTRU, such may be similar to the update procedure described above. That is, according to embodiments, the SU-WTRU may send messages to the SP-WTRU that forwards the information to the R-WTRU via the management link and the SP-WTRU may reply back to the SU-WTRU with the new R-L2 ID from the R-WTRU. According to embodiments, the SU-WTRU may specify the RID in its messages so that SP-WTRU uses the management link associated to the corresponding R-WTRU.

According to embodiments, there may be a case of only changing SP-WTRU's L2 ID. According to embodiments, a link identifier update procedure may be initiated by the SP-UE only for its own L2 ID (e.g. without having any of the R-WTRU or the SU-WTRU changing their L2 ID at the same time). According to embodiments, such may be similar to as described above, with the addition of the other link indication and current SP-L2 and R-L2 IDs and a new SL-L2 ID.

According to embodiments, there may be a case of only changing a SU-WTRU's L2 ID. According to embodiments, a link identifier update procedure may be initiated by the SU-WTRU only for its own L2 ID (e.g., without having any of the R-WTRU or the SP-WTRU change their L2 ID at the same time). According to embodiments, in such a case, the management link may be handled by the SP-WTRU, and thus, the SP-WTRU may need to be involved in the procedure, as described herein.

According to embodiments, there may be a case of multiple management links. According to embodiments, as for the single management link, the SP-WTRU may have a management link established with the R-WTRU, for example, for the management of all links related to a specific SP-L2 ID. In such a case, according to embodiments having a multiple management links feature (e.g., solution), the SU-WTRU may establish a management link directly with the R-WTRU to inform the R-WTRU about the SU-WTRU's new L2 IDs and to learn about the R-WTRU's new L2 IDs as well. According to embodiments, management links between the SP-WTRU and R-WTRU and between the SU-WTRU and R-WTRU may be independent. According to embodiments, every peer WTRU may manage their own links directly with the R-WTRU.

According to embodiments, in a case of multiple management links feature (e.g., solution), a R-WTRU may trigger establishment of a management link with a SU-WTRU, for example, in a case where (e.g., upon, when, after, etc.) a Link Identifier Update Request message is received from the SP-WTRU on the management link between the R-WTRU and the SP-WTRU. Such Link Identifier Update Request message may apply to (e.g., be associated with) a specific PC5 unicast link between the SP-WTRU and the SU-WTRU, via the R-WTRU. According to embodiments (e.g., although not shown in FIG. 18), other updated identifiers may (e.g., also) be exchanged between the SP-WTRU and the SU-WTRU, such that, for example, the security information may be updated and the application layer ID and IP address/prefix may be updated.

Figure 19:
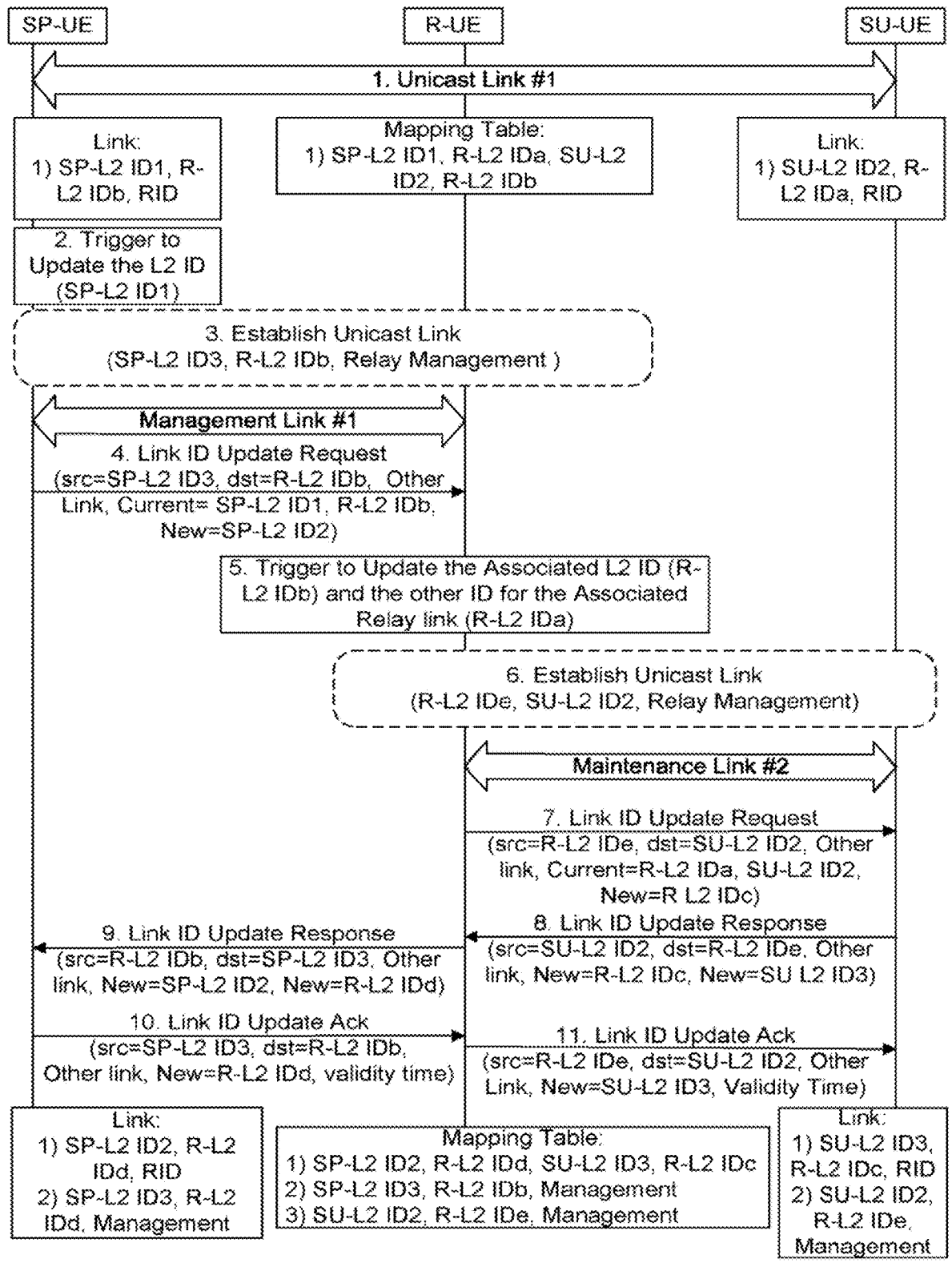
FIG. 19 is a diagram illustrating a SP-WTRU initiated Link Identifier Update Procedure on all WTRUs—Multiple Management Link, according to embodiments.

FIG. 19 is a diagram illustrating a SP-WTRU initiated Link Identifier Update Procedure on all WTRUs—Multiple Management Link, according to embodiments.

According to embodiments, at operation 1901, a unicast link may be established between the peers WTRUs via a R-WTRU. According to embodiments, the SP-WTRU may maintains a Link Table with its L2 ID (e.g., SP-L2 D1), the Relay L2 ID (e.g., R-L2 IDb) and an indication that this link is relayed by the R-WTRU (any of RID or RIND). According to embodiments, the SU-WTRU may also maintains a Link Table with its L2 ID (e.g., SU-L2 ID2), the Relay L2

ID (e.g., R-L2 IDa) and an indication that this link is relayed by the R-WTRU. According to embodiments, the R-WTRU may maintains a Mapping Table containing the SP L2 ID (e.g., SP-L2 ID1) with its associated Relay L2 ID (e.g., R-L2 IDa) and the SU-L2 ID (e.g., SU-L2 ID2) with its associated Relay L2 ID (e.g., R-L2 IDb).

According to embodiments, at operation 1902, the SP-WTRU may receive a trigger (e.g. a timer expiry) to update its SP-L2 ID1. According to embodiments, at operation 1903, optionally, the SP-WTRU may establish a secured unicast link with the R-WTRU, for link management purposes, if such a link is not already established, wherein SP-L2 ID3 and R-L2 IDb are used for the management link.

According to embodiments, at operation 1904, the SP-WTRU may assign itself a new SP-L2 ID2 to replace SP-L2 ID1 and may inform the R-WTRU by sending it a Link Identifier Update Request message, via the management link. According to embodiments, the message may have (e.g., use) the link management IDs as source and/or destination (e.g. SP-L2 ID3 and R-L2 IDb). According to embodiments, the content of the message may be modified to include any of: (i) an indication that the information is related to another link (e.g., an indicator for another link), and (ii) the current and new L2 IDs of another link, e.g., the L2 ID of the unicast link between the SP-WTRU and the SU-WTRU. According to embodiments, the message may be modified to (e.g., also) include the associated R-L2 ID (e.g., R-L2 IDb). According to embodiments, these L2 IDs are new fields in the Link Identifier Update Request message.

According to embodiments, at operation 1905, a R-WTRU may receive a Link Identifier Update Request message, for example, which triggers the update of the R-L2 IDb as well as the update of the associated L2 ID for the relay (e.g., R-L2 IDa). According to embodiments, at operation 1906, optionally, a R-WTRU may trigger the establishment of a management link (e.g., if such a link is not already established) with the peer WTRU (e.g., SU-WTRU) so that the SU-WTRU may update its L2 ID. According to embodiments, at operation 1907, the R-WTRU may send a Link Identifier Update Request to the SU-WTRU, the Request including any of: an indication that the update is for another link, the R-WTRU's current R-L2 IDa; and the R-WTRU's new R-L2 IDc (e.g., for replacing the current one). According to embodiments, a current SU-L2 ID2 may be also specified. According to embodiments, at operation 1908, a SU-WTRU may receive an identifier update request and may search for the matching entry of the indicated other link in its link table. According to embodiments, the SU-WTRU may save the new R-L2 IDc, may self-assign a new SU-L2 ID3, and may reply to the R-WTRU by sending a Link Identifier Update Response message including its new SU-L2 ID3. According to embodiments, the received new R-L2 IDc from the R-WTRU may be added to this message for acknowledgement purposes.

According to embodiments, at operation 1909, the R-WTRU may receive the response from the SU-WTRU, may find the entry corresponding to the identified other link in its mapping table, and may save the new SU-L2 ID3. According to embodiments, the R-WTRU may (e.g., then) self-assign a new R-L2 IDd to replace R-L2 IDb, and may reply to the SP-WTRU by sending a Link Identifier Update Response including its new R-L2 IDd. According to embodiments, the received new SP-L2 ID2 from the SP-UE (at operation 1904) may be added to this message, and the "other link" indication may be included as well. According to embodiments, at operation 1910, the SP-WTRU may reply to the R-WTRU with a Link Identifier Update Ack message, for example, to acknowledge the reception of the new Relay identifier and complete the update procedure. According to embodiments, a validity time may be included in (e.g., specified on) the message to enforce the usage of the new L2 IDs at the same time on all involved WTRUs. According to embodiments, in the case of the validity timer, the SP-WTRU may start a timer to expire at a time corresponding to the validity timer.

According to embodiments, at operation 1911, the R-WTRU may receive the message, may find the matching entry in its mapping table, may send a Link Identifier Update Ack message to the SU-WTRU, and may specify the new SU-L2 ID3 for acknowledgement. According to embodiments, in a case where a validity time was specified on the ACK message received from the SP-WTRU, then this time is added to the ACK message sent to the SU-WTRU. According to embodiments, the R-WTRU and the SU-WTRU may also start respective timers accordingly. According to embodiments, from this point on or at timer expiration, all new L2 IDs may be used on the unicast link between the SP-WTRU and the SU-WTRU, going through the R-WTRU.

According to embodiments, a Link Identifier Update procedure may be similar to multiple management links features (e.g., as discussed above). Furthermore, according to embodiments, a Link Identifier Update Procedure may be executed (e.g., directly) between the SP-WTRU and the SU-WTRU and the new L2 IDs that may be exchanged may be new Relay L2 IDs to be used by the SP-WTRU and the SU-WTRU. According to embodiments, in such a case, the SP-WTRU and the SU-WTRU may establish a management link with the R-WTRU, for example, to obtain the new Relay L2 ID that may be exchanged with the peer WTRU.

Figure 20:
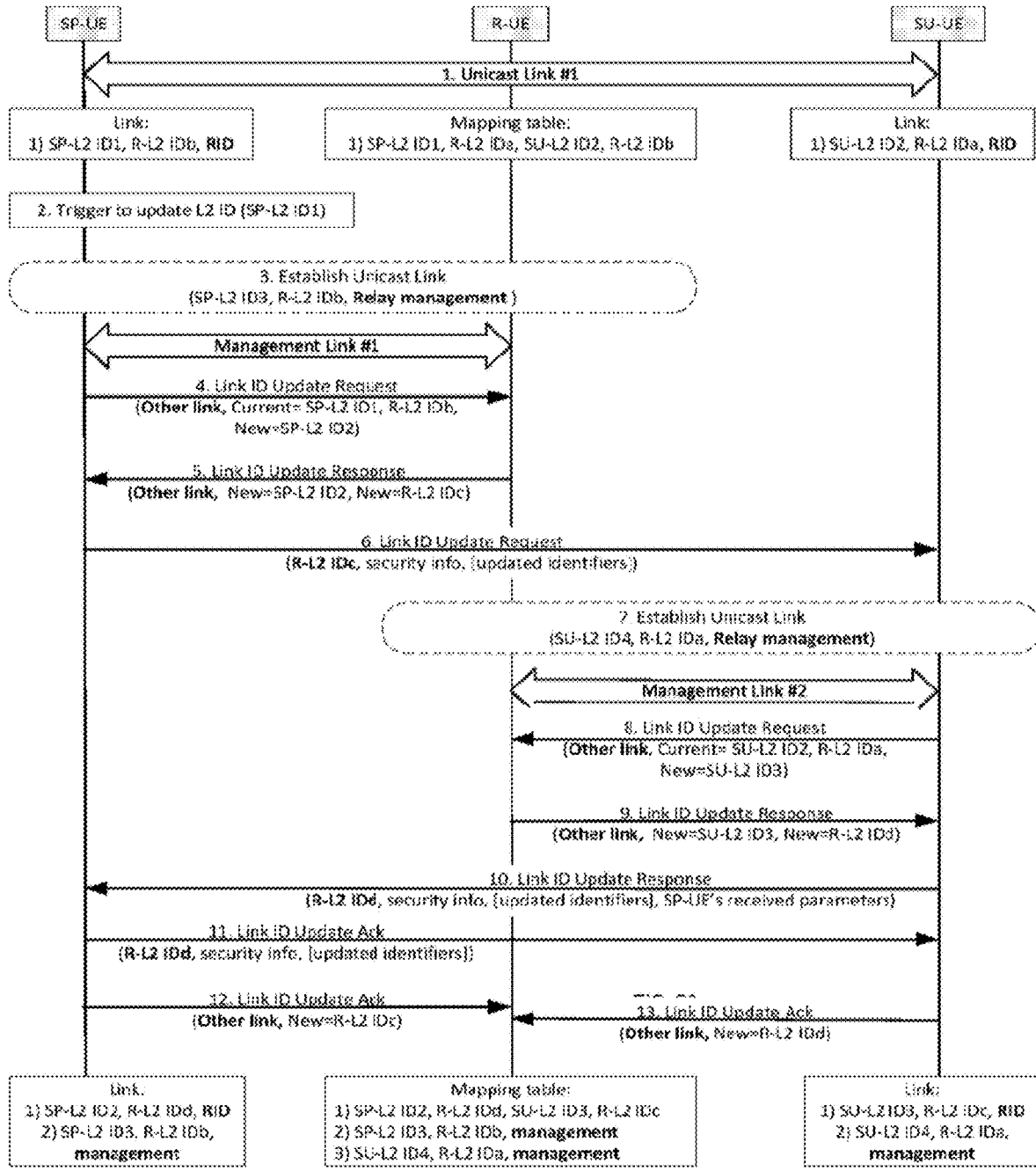
FIG. 20 is a diagram illustrating a SP-WTRU initiated Link Identifier Update Procedure including Multiple Management Links established by (e.g., both) peer WTRUs, according to embodiments.

FIG. 20 is a diagram illustrating a SP-WTRU initiated Link Identifier Update Procedure including Multiple Management Links established by (e.g., both) peer WTRUs, according to embodiments.

According to embodiments, at operation 2001, a SP-WTRU and a SU-WTRU may have a unicast link established via a R-WTRU. According to embodiments, in such a case, end-to-end security may be established, and a R-WTRU may forward messages between the two peer WTRUs (e.g., the SP-WTRU and the SU-WTRU), for example, by changing the source/destination L2 IDs. According to embodiments, a SP-WTRU and a R-WTRU may respectively use a SP-WTRU L2 ID1 and R-L2 IDb, and a SU-WTRU and a R-WTRU may respectively use a SU-WTRU L2 ID2 and a R-L2 IDa. According to embodiments, at operation 2002, a SP-WTRU may trigger the Link Identifier Update procedure. According to embodiments, at operation 2003, a SP-WTRU may establish a secured unicast link with a R-WTRU for management of existing relayed unicast links (e.g., unicast links that are established via the R-WTRU), for example, in a case where no such management link (e.g., already) exist.

According to embodiments, at operation 2004, a SP-WTRU may generate a new L2 ID and may send the L2 ID to the R-WTRU, for example, via (e.g., using, included in, etc.) a Link Identifier Update Request message. According to embodiments, such a message may be sent over the management link, and may include any of: a relay management indication (e.g., an other link indicator), any of a source L2 ID and a destination L2 ID identifying the link to be updated, and the SP-WTRU's new L2 ID (e.g., a SP-L2 ID2), that may be used with the identified link to be updated. According to embodiments, other identifiers (e.g., security info, application layer ID, IP address/prefix, etc.) may not be included in a Link Identifier Update Request to the R-WTRU, for example, because such other identifiers may (e.g., only) have meaning for (e.g., may only be associated with) a peer WTRU. According to embodiments, at operation 2005, a R-WTRU may send (e.g., reply with) a Link Identifier Update Response message including its new relay L2 ID (e.g., R-L2 IDc), for example, to replace the current relay L2 ID (e.g., R-L2 IDa) known (e.g., used) by the SU-WTRU.

According to embodiments, at operation 2006, a SP-WTRU may send a Link Identifier Update Request message to a SU-WTRU, via a R-WTRU, including any of the new R-L2 IDc and other updated identifiers (e.g., any of security information, optionally application layer ID, optionally IP address/prefix, etc.). According to embodiments, a Link Identifier Update Request message may be used as discussed above, except for the new L2 ID parameter that contains the new Relay L2 ID that may be used by the SU-WTRU (e.g., instead of the SP-WTRU's new L2 ID). According to embodiments, at operation 2007, a SU-WTRU may recognize (e.g., accept, store/record, keep track of, discern, acknowledge, apprehend, monitor, etc.) the updated parameters and the SU-WTRU may establish a secured unicast link with the R-WTRU for relayed (e.g., "other") unicast links management, for example, in a case where no such management link exists.

According to embodiments, at operation 2008, a SU-WTRU may send a Link Identifier Update Request message to the R-WTRU over a management link. According to embodiments, such message may include any of an other link indication, source/destination L2 IDs identifying a link that may be updated, and a SU-WTRU new L2 ID (SU-WTRU L2 ID3), for example, for updating the identified unicast link. According to embodiments, at operation 2009, R-WTRU may reply with a Link Identifier Update Response message including its new R-WTRU L2 ID (R-L2 IDd), for example, to replace the Relay L2 ID known by the SP-UE (R-L2 IDb). According to embodiments, at operation 2010, a SU-WTRU may send a Link Identifier Update Response message to a SP-WTRU, via a R-WTRU, the message including the new R-L2 IDd and other updated identifiers, such as, for example, security information and (e.g., optionally) any of an application layer ID and an IP address/prefix. According to embodiments, a SU-WTRU may (e.g., also) include the parameters received via the Link Identifier Update Request message.

According to embodiments, at operation 2011, a SP-WTRU may keep track of (e.g., accept, store/record, recognize, discern, acknowledge, apprehend, monitor, etc.) the updated parameters and may send a Link Identifier Update Ack message, to a SU-WTRU, including the parameters received via the Link Identifier Update Response message. According to embodiments, at operation 2012, a SP-WTRU may send a Link Identifier Update Ack message, to a R-WTRU, including the new R-L2 ID sent to a SU-WTRU and the other link indication. According to embodiments, at operation 2013, a SU-WTRU may send a Link Identifier Update Ack message, to the R-WTRU, including the new R-L2 ID sent to a SP-WTRU and the other link indication. According to embodiments, at operation 2014, (e.g., all) WTRUs (e.g., any of a SP-WTRU, a SU-WTRU, and a R-WTRU) may start using the new L2 IDs and other updated identifiers.

According to embodiments, a L2 link release procedure may be performed via a management link. According to embodiments, in a case of a relayed link, a link release procedure may be performed between the two peer WTRUs, for example in a manner similar to (e.g., the same) as that for a direct unicast link. According to embodiments, a Disconnect Request message may be sent to a peer WTRU, and, for example, in response, a peer WTRU may send a Disconnect Response message. According to embodiments, any of the disconnect request and disconnect response messages may be sent via a R-WTRU, and such messages may include a new $K_{NRP}$ ID, for example, that may be used on a subsequent DCR message to establish another unicast link between the same peer WTRUs.

According to embodiments, exchanging a new $K_{NRP}$ ID on the link release may avoid (e.g., prevent) linkability of the current unicast link with a subsequent unicast link between the same peer WTRUs. According to embodiments, the new $K_{NRP}$ ID may be preserved (e.g., saved, recorded, stored, etc.) on the peer WTRUs. According to embodiments, a R-WTRU may not (e.g., does not) need to know the new $K_{NRP}$ ID, for example, because the R-WTRU may not be involved in end-to-end authentication, authorization and security establishment. According to embodiments, in a case where (e.g., upon, after, etc.) the end-to-end link is released, a Disconnect Request message may be sent to the R-WTRU, for example, via the management link.

According to embodiments, a Disconnect Request message (e.g., in a manner similar to Link Identifier Update messages), may include any of an other link indication and L2 IDs identifying the link that has been released. According to embodiments, in a case where a Disconnect Request message includes such information, a R-WTRU may be able to update (e.g., release, revise, clean-up, delete parts of, etc.) its mapping table. For example, a R-WTRU may update its mapping table by any of: releasing the two R-WTRU L2 IDs allocated for the forwarding of this link; and deleting the entry with the SP-WTRU and SU-WTRU L2 IDs. According to embodiments, a Disconnect Request message may be sent by both peer WTRUs, for example, in a case where multiple management links are used. According to embodiments, a R-WTRU may clean-up its mapping table and may reply to the WTRU with a Disconnect Response message including any of: the L2 IDs identifying the link that has been released, and the other link indication.

According to embodiments, a DCA may be a Direct Communication Accept; a DCR may be a Direct Communication Request; a RID may be a R-WTRU Identifier; a R-WTRU may be a WTRU to WTRU relay; an SMC may be a Security Mode Command; SP-WTRU may be a Service Provider WTRU; and a SU-WTRU may be a Service Utilizing WTRU.

Service Oriented Discovery and Communication via a Relay WTRU (R-WTRU)

As discussed above, there may be a case of a (e.g., conventional) WTRU-to-WTRU relay using IP based mechanisms providing support only for WTRU oriented discovery and unicast (e.g., IP, L2, etc.) communications. On the other hand, according to embodiments, there may be a case of (e.g., as discussed above) a (e.g., non-conventional, new) WTRU-to-WTRU relay, which may be referred to as a R-WTRU, may provide support for any of service-oriented discovery and groupcast (e.g., IP, L2, etc.) communications. That is, according to embodiments, a R-WTRU may support more (e.g., all possible) types of discovery and communications. According to embodiments, an IP based service-oriented discovery and groupcast communications may be performed (e.g., enabled) using a R-WTRU, for example, acting as a "non-transparent" IP based relay between a SP-WTRU and any number of SU-WTRUs.

According to embodiments, a SU-WTRU may discover a ProSe Service provided by a SP-WTRU, for example, using (e.g., via) an IP based WTRU to WTRU relay, such as, for example, a R-WTRU. According to embodiments, a SP-WTRU may provide a list of ProSe Service IDs to a R-WTRU (e.g., an IP-based WTRU to WTRU relay), for example, upon or after (e.g., on condition that) a PC5 connection with R-WTRU is established. According to embodiments, a R-WTRU may any of determine (e.g., know, be signaled, etc.) and/or store an association between a list of ProSe Service IDs and SP-WTRU IDs.

According to embodiments, in a case where a SU-WTRU requests a (e.g., available) ProSe service from a R-WTRU, the R-WTRU may provide (e.g., transmit, reply with, etc.) any number of any of SP-WTRU IDs associated with the requested ProSe service and (e.g., corresponding, associated, etc.) ProSe service IDs. According to embodiments, (e.g., upon receiving any of SP-WTRU IDs and ProSe service IDs), a SP-WTRU may provide the list of ProSe Service IDs and SP-WTRU IDs to the R-WTRU), for example, using (e.g., via) any of a DCR message, a authentication message, (e.g., during) a security establishment procedure.

According to embodiments, a R-WTRU may transmit (e.g., reply with, to the SP-WTRU) any number of any of SP-WTRU IDs associated with a requested ProSe service and ProSe Service IDs, for example, using (e.g., via) a DNS response message. According to embodiments, a SP-WTRU ID may refer to any of an IP address, a Layer 2 (L2) ID, an application layer ID, etc. According to embodiments, a ProSe service (e.g., requested by a SU-WTRU) may be mapped to any number of ProSe service IDs, for example, by a R-WTRU. For example, a requested ProSe service may be "Restaurant", which may be mapped to any of "Restaurant_A", "Restaurant_B", etc. According to embodiments, (e.g., before replying to a ProSe service request received from a SU-WTRU) a R-WTRU may verify whether (e.g., that) a SU-WTRU is authorized to discover the requested ProSe service, for example, based on authorization parameters (e.g., that are any of (pre)configured or received from a (core) network), which may include any number of any of SU-WTRU IDs and allowed ProSe service IDs.

According to embodiments, a SP-WTRU may provide any of a list of service IDs and flags indicating any of restricted service discovery and restricted access. According to embodiments, (e.g., such) flags may be stored by a R-WTRU, along with (e.g., in addition to) mapping information, such as that discussed above. According to embodiments, for example, in a case where a SU-WTRU queries service information, for example, by sending a request to a R-WTRU, for a service associated with a restriction flag, the R-WTRU may send a request to a SP-WTRU, for example, by (e.g., first) providing SU-WTRU information (e.g., the request to the SP-WTRU includes user information).

According to embodiments, a R-WTRU may provide service information (e.g., a SP-WTRU IP address) to a SU-WTRU. According to embodiments, such service information may be provided on condition that a SP-WTRU authorizes the R-WTRU to provide such information, for example, based on information provided by the SU-WTRU. According to embodiments, a service may be restricted based on application requirements (e.g., only specific users, a number of concurrent users is limited to a maximum, etc.). On the other hand, according to embodiments, a R-WTRU may request authorization from a ProSe function (e.g., as described herein), for example, based on the presence of a service restriction flag. According to embodiments, a service restriction flag may indicate whether a R-WTRU may request authorization (e.g., for a service) from any of a ProSe function and a SP-WTRU. According to embodiments, for example, in a case where a R-WTRU is out of network coverage (e.g., the R-WTRU is unable to reach or communicate with a ProSe function), a R-WTRU may: (1) request authorization from a SP-WTRU (e.g., as a fallback mechanism); and/or (2) deny, for example, the SU-WTRU, access to service information (e.g., until the R-WTRU comes back into network coverage).

According to embodiments, a R-WTRU may perform (e.g., do, execute, have behaviors including, etc.) any of: (1) receive a list of ProSe service IDs from a SP-WTRU; (2) stores an association between the list of ProSe service IDs and SP-WTRU IDs; and (3) reply with (e.g., transmit) any number of any of SP-WTRU IDs and associated ProSe service IDs, for example, after receiving a ProSe service request from a SU-WTRU. According to embodiments, a SP-WTRU may (e.g., perform, do, execute, have behaviors including, etc.) provide a list of ProSe service IDs to a R-WTRU.

According to embodiments, a SU-WTRU may perform (e.g., do, execute, have behaviors including, etc.) any of: (1) send (e.g., a message including, a signal for, etc.) a ProSe service request to a R-WTRU, the ProSe service request including (e.g., identifying) a requested ProSe service; and (2) receive any number of any of SP-WTRU IDs and associated ProSe service IDs.

According to embodiments, a SP-WTRU may provide (e.g., transmit, send, register, etc.) any number of (e.g., its) ProSe service IDs to a ProSe function. According to embodiments, for example, in a case where a SP-WTRU establishes a PC5 connection (e.g., on condition that a PC5 connection is established) with a R-WTRU, the R-WTRU may send, to a ProSe function, a ProSe service query message including a SP-WTRU ID. According to embodiments, a ProSe function may send (e.g., reply), to a R-WTRU, with a list of ProSe service IDs associated with the SP-WTRU. According to embodiments, a R-WTRU may store an association between the list of ProSe Service IDs and SP-WTRU IDs. According to embodiments, in a case where a SU-WTRU requests an available ProSe service from the R-WTRU, the R-WTRU may reply with any number of any of SP-WTRU IDs associated with the requested ProSe service and ProSe service IDs.

According to embodiments, a R-WTRU may perform (e.g., do, execute, behave so as to, etc.) any of: (1) receive a SP-WTRU ID from a SP-WTRU; (2) send a ProSe service query message, for example, including a SP-WTRU ID, to a ProSe function; (3) receives a list of ProSe service IDs associated with a SP-WTRU from a ProSe function; (4) stores an association between a list of ProSe service IDs and any number of SP-WTRU IDs; (5) and, for example, after receiving a ProSe service request from a SU-WTRU, reply with any number of any of SP-WTRU IDs and associated ProSe Service IDs.

According to embodiments, a SP-WTRU may perform (e.g., do, execute, have behaviors including, etc.) any of: (1) provide a list of ProSe service IDs to the ProSe function; and (2) send a SP-WTRU ID to a R-WTRU. According to embodiments, a SU-WTRU may perform (e.g., do, execute, have behaviors including, etc.) any of: (1) send a ProSe service request to a R-WTRU, for example, indicating a requested ProSe service ID; and (2) receive any number of any of SP-WTRU IDs and associated ProSe service IDs.

CONCLUSION

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a UE, WTRU, terminal, base station, RNC, or any host computer.

Moreover, in the embodiments described above, processing platforms, computing systems, controllers, and other devices including the constraint server and the rendezvous point/server containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed".

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the exemplary embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost vs. efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs), Field Programmable Gate Arrays (FPGAs) circuits, any other type of integrated circuit (IC), and/or a state machine.

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

It is also to be understood that the terminology used herein is for the purpose of describing particular embodiments only, and is not intended to be limiting. As used herein, when referred to herein, the terms "user equipment" and its abbreviation "UE" may mean (i) a wireless transmit and/or receive unit (WTRU), such as described infra; (ii) any of a number of embodiments of a WTRU, such as described infra; (iii) a wireless-capable and/or wired-capable (e.g., tetherable) device configured with, inter alia, some or all structures and functionality of a WTRU, such as described infra; (iii) a wireless-capable and/or wired-capable device configured with less than all structures and functionality of a WTRU, such as described infra; or (iv) the like. Details of an example WTRU, which may be representative of any WTRU recited herein.

In certain representative embodiments, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" or "group" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶6 or means-plus-function claim format, and any claim without the terms "means for" is not so intended.

A processor in association with software may be used to implement a radio frequency transceiver for use in a wireless transmit receive unit (WTRU), user equipment (UE), terminal, base station, Mobility Management Entity (MME) or Evolved Packet Core (EPC), or any host computer. The WTRU may be used in conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A method implemented by a relay wireless transmit/receive unit (WTRU), the method comprising:
    receiving a first discovery message from a first WTRU, the first discovery message comprising a first identifier (ID) for the first WTRU;
    modifying the received first discovery message by adding a relay ID (RID) identifying the relay WTRU and by replacing the first ID for the first WTRU with a first relay ID for the relay WTRU;
    sending the modified discovery message;
    receiving a link establishment message from a second WTRU in response to the modified discovery message, the link establishment message comprising a second ID for the second WTRU;
    modifying the received link establishment message by adding the RID and replacing the second ID for the second WTRU with a second relay ID for the relay WTRU;
    forwarding the modified link establishment message to the first WTRU; and
    relaying PC5 unicast messages between the first WTRU and second WTRU, wherein PC5 unicast messages received from the first WTRU that indicate a destination associated with the second relay ID of the relay WTRU are forwarded to the second WTRU with an indication of a source associated with the first relay ID of the relay WTRU.

2. The method of claim 1, wherein PC5 unicast messages received from the second WTRU that indicate a destination associated with the first relay ID of the relay WTRU are forwarded to the first WTRU with an indication of a source associated with the second relay ID of the relay WTRU.

3. The method of claim 1, wherein the first discovery message comprises an indication of a service provided by the first WTRU, and wherein the modified discovery message comprises an indication of the service provided by the first WTRU.

4. The method of claim 1, further comprising generating a mapping table indicating a relationship between the first relay ID, the first ID, the second ID, and the service provided by the first WTRU.

5. The method of claim 1, further comprising receiving at least one relay policy, wherein a determination to send the modified discovery message is in accordance with the at least one relay policy.

6. The method of claim 1, further comprising receiving authorization to act as a relay WTRU, during registration with a network.

7. The method of claim 1, wherein the first discovery message is a direct communication request message.

8. A relay wireless transmit/receive unit (WTRU) comprising:
    a transceiver configured to receive a first discovery message from a first WTRU, the first discovery message comprising a first identifier (ID) for the first WTRU; and
    a processor configured to:
        modify the received first discovery message by adding a relay ID (RID) identifying the relay WTRU and by replacing the first ID for the first WTRU with a first relay ID for the relay WTRU;
        send the modified discovery message;
        receive, via the transceiver, a link establishment message from a second WTRU in response to the modified discovery message, the link establishment message comprising a second ID for the second WTRU;
        modify the received link establishment message by adding the RID and replacing the second ID for the second WTRU with a second relay ID for the relay WTRU;
        forward, via the transceiver, the modified link establishment message to the first WTRU; and
        relay, via the transceiver, PC5 unicast messages between the first WTRU and second WTRU, wherein PC5 unicast messages received from the first WTRU that indicate a destination associated with the second relay ID of the relay WTRU are forwarded to the second WTRU with an indication of a source associated with the first relay ID of the relay WTRU.

9. The relay WTRU of claim 8, wherein PC5 unicast messages received from the second WTRU that indicate a destination associated with the first relay ID of the relay WTRU are forwarded to the first WTRU with an indication of a source associated with the second relay ID of the relay WTRU.

10. The relay WTRU of claim 8, wherein the first discovery message comprises an indication of a service provided by the first WTRU, and wherein the modified discovery message comprises an indication of the service provided by the first WTRU.

11. The relay WTRU of claim 8, the processor further configured to generate a mapping table indicating a relationship between the first relay ID, the first ID, the second ID, and the service provided by the first WTRU.

12. The relay WTRU of claim 8, wherein the transceiver further is configured to receive at least one relay policy, and wherein the processor further is configured to determine to send the modified discovery message is in accordance with the at least one relay policy.

13. The relay WTRU of claim 8, the transceiver further configured to receive authorization to act as a relay WTRU, during registration with a network.

14. The relay WTRU of claim 8, wherein the first discovery message is a direct communication request message.

15. The relay WTRU of claim 8, the processor further configured to send, via the transceiver, a message comprising an indication of groupcast communications relaying capabilities of the relay WTRU.

\* \* \* \* \*